United States Patent
Tanaka

(10) Patent No.: US 6,538,407 B2
(45) Date of Patent: Mar. 25, 2003

(54) MOTOR CONTROL METHOD AND MOTOR CONTROL APPARATUS

(75) Inventor: Hirotomo Tanaka, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 71 days.

(21) Appl. No.: 09/779,658

(22) Filed: Feb. 9, 2001

(65) Prior Publication Data

US 2001/0028231 A1 Oct. 11, 2001

(30) Foreign Application Priority Data

Feb. 9, 2000 (JP) .................................. 2000-032035
Feb. 9, 2000 (JP) .................................. 2000-032049

(51) Int. Cl.⁷ .............................................. H02P 7/00
(52) U.S. Cl. ...................... 318/445; 318/254; 318/434; 318/447; 74/665
(58) Field of Search ................. 318/445, 696, 318/254, 685, 138, 434, 447; 74/665

(56) References Cited

U.S. PATENT DOCUMENTS

| | | | | |
|---|---|---|---|---|
| 4,330,739 A | * | 5/1982 | Chiang | 318/490 |
| 4,739,346 A | * | 4/1988 | Buckley | 310/49 R |
| 4,788,479 A | * | 11/1988 | Rodi | 318/439 |
| 5,008,607 A | * | 4/1991 | Ono et al. | 318/685 |
| 5,029,264 A | * | 7/1991 | Ito et al. | 318/685 |
| 5,147,143 A | * | 9/1992 | Morita et al. | 400/279 |
| 6,015,202 A | * | 1/2000 | Hiramatsu et al. | 347/32 |
| 6,054,835 A | * | 4/2000 | Thiemann et al. | 318/685 |
| 6,144,184 A | * | 11/2000 | Yamaguchi | 318/254 |
| 6,150,777 A | * | 11/2000 | Lander | 310/233 |
| 6,392,377 B1 | * | 5/2002 | Yamauchi | 318/280 |

* cited by examiner

Primary Examiner—Rita Leykin
(74) Attorney, Agent, or Firm—Sughrue Mion, PLLC

(57) ABSTRACT

A motor control method and a motor control apparatus according to the invention supply a DC motor for a predetermined time period upon starting said DC motor with a d.c. current as an initial value current, which is smaller than a threshold value current required for a first gear coupled to a rotor shaft of said DC motor to drive and rotate a second gear in engagement with said first gear.

A motor control method and a motor control apparatus according to the invention may generate in a deceleration control period a waveform pattern of a target speed VC expressed by $$VC = V\max\{1-(x/N)^a\} \text{ (a is an arbitrary constant)}$$

where V max is the maximum speed of a motor to be controlled, N is the distance of each deceleration control period from a start position of a deceleration control period to a target stop position, and x is the distance from the start position of the deceleration control period to a current position, and for executing deceleration control of the motor in accordance with the waveform pattern of the target speed VC.

33 Claims, 16 Drawing Sheets

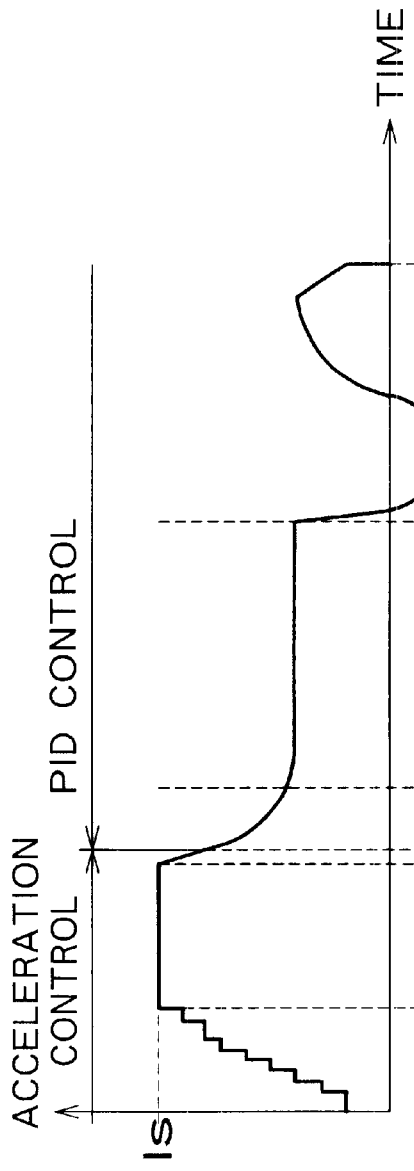
FIG. 8A MOTOR CURRENT
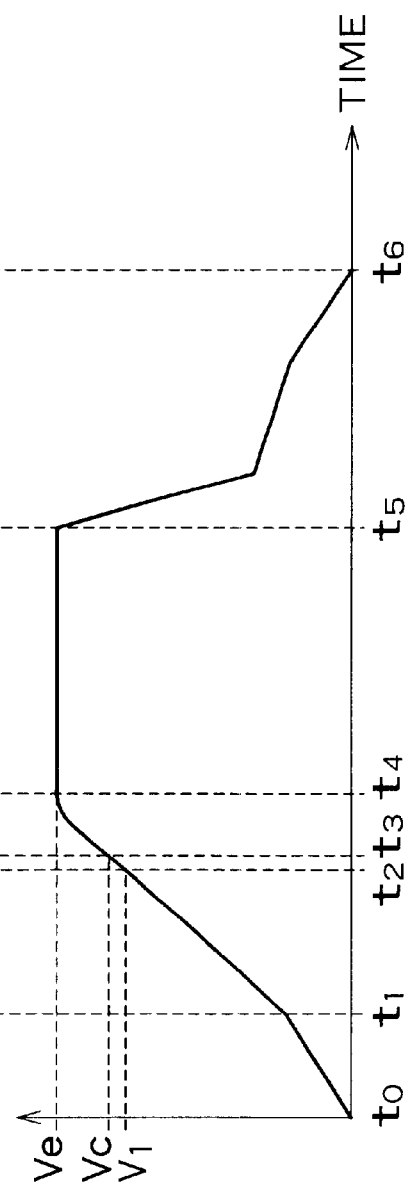
FIG. 8B MOTOR SPEED

MOTOR CONTROL METHOD AND MOTOR CONTROL APPARATUS

BACKGROUND OF THE INVENTION

1. Field of the Invention

This invention relates to a motor control method and a motor control apparatus, and more particularly, to a motor control method and a control apparatus for preventing generation of noise at the engaging portion of gears upon the start of a DC motor due to the backlash of the gears of the DC motor and the cogging torque of the DC motor, for example.

The invention especially relates to a motor control method and a control apparatus capable of stabilizing behaviors of the target of control during its deceleration control and thereby ensuring precise control.

The invention also relates to a recording medium recorded with a computer program for executing each of the motor control methods.

2. Related Background Art

First explained is general configuration of an ink jet printer using a motor control device and its control method.

FIG. 1 is a block diagram that shows general configuration of an ink jet printer.

The ink jet printer shown in FIG. 1 includes a paper feed motor (hereinafter also called a PF motor) 1 that feeds paper; a paper feed motor driver 2 that drives the paper feed motor 1; a carriage 3 that supports a head 9 fixed thereto to supply ink onto printing paper 50 and is driven to move in parallel to the printing paper 50 and vertically of the paper feeding direction; a carriage motor (hereinafter also called a CR motor) 4 that drives the carriage 3; a CR motor driver 5 that drives the carriage motor 4; a DC unit 6 that outputs a d.c. current for controlling the CR motor driver 5; a pump motor 7 that controls the draft of ink for the purpose of preventing clogging of the head 9; a pump motor driver 8 that drives the pump motor 7; a head driver 10 that drives and controls the head 9; a linear encoder 11 fixed to the carriage 3; a linear encoder coding plate 12 having slits in predetermined intervals; a rotary encoder 13 for the PF motor 1; a paper detecting sensor 15 that detects the terminal position of each sheet of paper under printing; a CPU 16 that controls the whole printer; a timer IC 17 that periodically generates interruption signals to the CPU 16; an interface portion (hereinafter also called IF) 19 that exchanges data with a host computer 18; an ASIC 20 that controls the character resolution, driving waveform of the head 9, and so on, in accordance with character information sent from the host computer 18 through the IF 19; a PROM 21, a RAM 22 and an EEPROM 23 that are used as an operation area of the ASIC 20 and the CPU 16 and a program storage area; a platen that supports the printing paper 50; a transport roller 27 driven by the PF motor 1 to transport the printing paper 50; a pulley 30 attached to a rotating shaft of the CR motor 4; and a timing belt 31 driven by the pulley 30.

The DC unit 6 controls and drives the paper feed motor driver 2 and the CR motor driver 5 in response to a control instruction sent from the CPU 16 and outputs of the encoders 11, 13. Both the paper feed motor 1 and the CR motor 4 are DC motors.

FIG. 2 is a perspective view that illustrates configuration around the carriage 3 of the ink jet printer.

As shown in FIG. 2, the carriage 3 is connected to the carriage motor 4 by the timing belt 31 via the pulley 30, and driven to move in parallel with the platen 25 under guidance of a guide member 32. The carriage 3 has the recording head 9 projecting from its surface opposed to the printing paper and having a row of nozzles for releasing black ink and a row of nozzles for releasing color ink. These nozzles are supplied with ink from the ink cartridge 34 and release drops of ink onto the printing paper to print characters and images.

In a non-print area of the carriage 3, there is provided a capping device 35 for shutting nozzle openings of the recording head 9 when printing is not executed, and a pump unit 36 having the pump motor 7 shown in FIG. 1. When the carriage 3 moves from the print area to the non-print area, it contacts a lever, not shown, and the capping device 35 moves upward to close the head 9.

When any of the nozzle openings of the head 9 is clogged, or ink is forcibly released from the head 9 just after replacement of the cartridge 34, the pump unit 36 is activated while closing the head 9, and a negative pressure from the pump unit 36 is used to suck out ink from the nozzle openings. As a result, dust and paper powder are washed out from around the nozzle openings, and bubbles in the head 9, if any, are discharged together with the ink to the cap 37.

FIG. 3 is a diagram schematically illustrating configuration of the linear encoder 11 attached to the carriage 3.

The encoder 11 shown in FIG. 3 includes a light emitting diode $11a$, collimator lens $11b$ and detector/processor $11c$. The detector/processor $11c$ has a plurality of (four) photo diodes $11d$, signal processing circuit $11e$, and tow comparators $11_{fA}$, $11_{fB}$.

When a voltage $V_{CC}$ is applied across opposite ends of the light emitting diode $11a$ through a resistor, light is emitted from the light emitting diode $11a$. This light is collimated into parallel beams by the collimator lens $11b$, and the beams pass through the coding plate 12. The coding plate 12 has slits in predetermined intervals (for example, in intervals of $\frac{1}{180}$ inch).

Parallel beams passing through the coding plate 12 enter into photo diodes $11d$ through fixed slits, not shown, and are converted into electric signals. Electric signals output from these four photo diodes $11d$ are processes in the signal processing circuit $11e$. Signals output from the signal processing circuit $11e$ are compared in the comparators $11_{fA}$, $11_{fB}$, and comparison results are output as pulses. Pulses ENC-A, ENC-B output from the comparators $11_{fA}$, $11_{fB}$ are outputs of the encoder 11.

FIGS. 4A and 4B are timing charts showing waveforms of two output signals from the encoder 11 during normal rotation of the CR motor and during its reverse rotation.

As shown in FIGS. 4A and 4B, in both normal rotation and reverse rotation of the CR motor, the pulse ENC-A and the pulse ENC-B are different in phase by 90 degrees. The encoder 4 is so configured that the pulse ENC-A is forward in phase by 90 degrees relative to the pulse ENC-B as shown in FIG. 4A when the CR motor 4 rotates in the normal direction, i.e., when the carriage 3 is moving in its main scanning direction whereas the pulse ENC-A is behind in phase by 90 degrees relative to the pulse ENC-B as shown in FIG. 4B when the CR motor 4 rotates in the reverse direction. Then, one period T of these pulses corresponds to each interval of the slits of the coding plate 12 (for example, $\frac{1}{180}$ inch), and it is equal to the time required for the carriage 3 to move from a slit to another.

On the other hand, the rotary encoder 13 for the PF motor 1 has the same configuration as the linear encoder 11 except that the former is a rotatable disc that rotates in response to rotation of the PF motor 1, and the rotary encoder 13 also outputs two output pulses ENC-A, ENC-B. In ink jet printers, in general, slit interval of a plurality of slits provided on a coding plate of the encoder 13 for the PF motor 1 is 1/180 inch, and paper is fed by 1/144 inch when the PF motor rotates by each slit interval.

FIG. 5 is a perspective view showing a part related to paper feeding and paper detection.

With reference to FIG. 5, explanation is made about the position of the paper detecting sensor 15 shown in FIG. 1. In FIG. 5, a sheet of printing paper 50 inserted into a paper feed inlet 61 of a printer 60 is conveyed into the printer 60 by a paper feed roller 64 driven by a paper feed motor 63. The forward end of the printing paper 50 conveyed into the printer 60 is detected by an optical paper detecting sensor 15, for example. The paper 50 whose forward end is detected by the paper detecting sensor 15 is transported by a paper feed roller 65 driven by the PF motor 1 and a free roller 66.

Subsequently, ink is released from the recording head (not shown) fixed to the carriage 3 which moves along the carriage guide member 32 to print something on the printing paper 50. When the paper is transported to a predetermined position, the terminal end of the printing paper 50 currently under printing is detected by the paper detecting sensor 15. The printing paper 50 after printing is discharged outside from a paper outlet 62 by a discharge roller 68 driven by a gear 67C, which is driven by the PF motor 1 via gears 67A, 67B, and a free roller 69.

FIG. 6 is a perspective view illustrating details of parts associated to paper feeding in a printer, where a paper feeding roller 65 has a rotation axis coupled to a rotary encoder 13.

With reference to FIG. 6 and FIG. 5, the parts in the printer associated to the paper feeding will now be described in details.

When a leading end of a printing paper 50, which has been inserted through a paper feed inlet 61 into a printer 60 by a sheet supplying roller 64, is detected by a paper detecting sensor 15, the paper feeding roller 65 and a follower roller 66 are cooperative in feeding the printing paper 50. The paper feeding roller 65 is provided on and about a smap shaft 83 or a rotation axis of a large gear 67a engaged with a small gear 87 driven by a PF motor 1 while the follower roller 66 is provided in a holder 89 at its paper evacuating end in the context of a paper feeding direction, where the printing paper 50 from a paper supply source is pressed vertically.

The PF motor 1 is fitted in and secured to a frame 86 in the printer 60 by a screw 85, and the rotary encoder 13 is placed in a specified position around the large gear 67a while a character board 14 for the rotary encoder is connected to the smap shaft 83 or the rotation axis of the large gear 67a.

After the printing paper 50, which has already been supplied by the paper feeding roller 65 and the follower roller 66 into the printer, passes over a platen 84 serving to support the printing paper 50, a paper evacuating gear 68 which is rotated by the PF motor 1 via a group of gears, the small gear 87, the large gear 67a, a medium gear 67b, a small gear 88, and a paper evacuating gear 67c, and a toothed roller 69 or a follower roller cooperatively presses and holds the printing paper 50 between them to further feed the printing paper 50 until it is evacuated from the paper outlet 62 to the outside of the printer.

While the printing paper 50 lies over the platen 84, a carriage 3 moves laterally in a space defined above the platen 84 along a guide member 32, and simultaneously, ink is injected from a recording head (not shown) fixed to the carriage 3 to print characters in the printing paper.

Now, an arrangement of a DC unit 6 will be described, which is a prior art DC motor control apparatus used to control a carriage (CR) motor 4 for such an ink jet printer as mentioned above, and additionally, a control method by the DC unit 6 will also be explained.

FIG. 7 is a block diagram showing an arrangement of the DC unit 6 serving as the DC motor control apparatus while FIGS. 8A and 8B are graphs illustrating time—varying motor current and motor speed of the CR motor 4 under control by the DC unit 6.

The DC unit 6 shown in FIG. 7 includes a position operator 6a, a subtracter 6b, a target speed operator 6c, a speed operator 6d, a subtracter 6e, a proportional element 6f, an integral element 6g, a differential element 6h, an adder 6i, a D/A converter 6j, a timer 6k, and an acceleration controller 6m.

The position operator 6a detects rising edges and tail edges of the output pulses ENC-A and ENC-B of the encoder 11, then counts the number of edges detected, and operates the position of the carriage 3 from the counted value. This counting adds "+1" when one edge is detected while the CR motor 4 rotates in the normal direction, and adds "−1" when one edge is detected while the CR motor 4 rotates in the reverse direction. Period of pulses ENC-A and period of pulses ENC-B are equal to the slit interval of the coding plate 12, and the pulses ENC-A and ENC-B are different in phase by 90 degrees. Therefore, the count value "1" of that counting corresponds to ¼ of the slit interval of the coding plate 12. As a result, distance of the movement from the position of the carriage 3, at which the count value corresponds to "0", can be obtained by multiplying the above count value by ¼ of the slit interval. Resolution of the encoder 11 in this condition is ¼ of the slit interval of the coding plate 12. If the slit interval is 1/180 inch, then the resolution is 1/720 inch.

The subtracter 6b operates positional difference between the target position sent from the CPU 16 and the actual position of the carriage 3 obtained by the position operator 6a.

The target speed calculator 6c computes a target speed of the carriage 3 by referring to a positional deviation produced by a subtracter 6b. A result of the arithmetic operation is obtained by a multiply operation of the positional deviation by a gain KP. The gain KP varies depending upon the positional deviation. A value of the gain KP may be stored in a look-up table not shown.

The speed calculator 6d computes the speed of the carriage 3 on the basis of the output pulses ENC-A and ENC-B from the encoder 11. The speed is obtained in a manner as explained below. First, rising edges and tail edges of output pulses ENC-A, ENC-B of the encoder 11 are detected, and the duration of time between edges corresponding to ¼ of the slit interval of the coding plate 12 is counted by a timer counter, for example. When the count value is T and the slit interval of the coding plate 12 is λ, the speed of the carriage is obtained as λ/(4T). Note here that operation of the speed is performed by measuring one period of output pulses ENC-A, e.g., from a rising edge to the next rising edge, by means of a timer counter.

The subtracter 6e operates speed difference between the target speed and the actual speed of the carriage 3 operated by the speed operator 6d.

The proportional element 6f multiplies the speed difference by a constant Gp, and outputs its multiplication result. The integral element 6g cumulates products of speed differences and a constant Gi. The differential element 6h multiplies the difference between the current speed difference and its preceding speed difference by a constant Gd, and outputs its multiplication result. Operations of the proportional element 6f, the integral element 6g and the differential element 6h are conducted in every period of output pulses ENC-A of the encoder 11, synchronizing with the rising edge of each output pulse ENC-A, for example.

Outputs of the proportional element 6f, the integral element 6g and the differential element 6h are added in the adder 6i. Then, the result of the addition, i.e., the drive current of the CR motor 4, is sent to the D/A converter 6j and converted into an analog current. Based on this analog current, the CR motor 4 is driven by the driver 5.

The timer 6k and the acceleration controller 6m are used for controlling acceleration whereas PID control using the proportional element 6f, the integral element 6g and the differential element 6h is used for constant speed and acceleration control during acceleration.

The timer 6k generates a timer interrupt signal every predetermined interval in response to a clock signal sent from the CPU 16.

The acceleration controller 6m cumulates a predetermined current value (for example 20 mA) to the target current value every time it receives the timer interrupt signal, and results of the integration, i.e, target current values of the DC motor during acceleration, are sent to the D/A converter 6j from time to time. Similarly to PID control, the target current value is converted into an analog current by the D/A converter 6j, and the CR motor 4 is driven by the driver 5 according to this analog current.

The driver 5 has four transistors, for example, and it can create (a) a drive mode for rotating the CR motor 4 in the normal or reverse direction; (b) a regeneration brake drive mode (a short brake drive mode, which is the mode maintaining a halt of the CR motor); and (c) a mode for stopping the CR motor, by turning those transistors ON or OFF in accordance with outputs from the D/A converter 6j.

Next explained is the performance of the DC unit 6, that is, the conventional DC motor control method, with reference to FIGS. 8A and 8B.

While the CR motor 4 stops, when a start instruction signal for starting the CR motor 4 is sent from the CPU 16 to the DC unit 6, a start initial current value $I_0$ is sent from the acceleration controller 6m to the D/A converter 6j. This start initial current value $I_0$ is sent together with the start instruction signal from the CPU 16 to the acceleration controller 6m. Then, this current value $I_0$ is converted into an analog current by the D/A converter 6j and sent to the driver 5 which in turn start the CR motor 4 (see FIGS. 8A and 8B). After the start instruction signal is received, the timer interrupt signal is generated every predetermined interval from the timer 6k. The acceleration controller 6m cumulates a predetermined current value (for example, 20 mA) to the start initial current value $I_0$ every time it receives the timer interrupt signal, and sends the cumulated current value to the D/A converter 6j. Then, the cumulated current value is converted into an analog current by the D/A converter 6j and sent to the driver 5. Then, the CR motor is driven by the driver 5 so that the value of the current supplied to the CR motor 4 becomes the cumulated current value mentioned above, and the speed of the CR motor 4 increases (see FIG. 8B). Therefore, the current value supplied to the CR motor 4 represents a step-like aspect as shown in FIG. 8A. At that time, the PID control system also works, but the D/A converter 6j selects and employs the output from the acceleration controller 6m.

Cumulative processing of current values of the acceleration controller 6m is continued until the cumulated current value reaches a fixed current value $I_S$. When the cumulated current value reaches the predetermined value $I_S$ at time t1, the acceleration controller 6m stops its cumulative processing, and supplies the fixed current value $I_S$ to the D/A converter 6j. As a result, the CR motor 4 is driven by the driver 5 such that the value of the current supplied to the CR motor 4 becomes the current value $I_S$ (see FIG. 8A).

In order to prevent the speed of the CR motor 4 from overshooting, if the speed of the CR motor 4 increases to a predetermined value V1 (see time t2), the acceleration controller 6m makes a control to reduce the current supplied to the CR motor 4. At that time, the speed of the CR motor 4 further increases, but when it reaches a predetermined speed Vc (see time t3 of FIG. 8B), the D/A converter 6j selects the output of the PID control system, i.e., the output of the adder 6i, and PID control is effected.

That is, based on the positional difference between the target position and the actual position obtained from the output of the encoder 11, the target speed is operated, and based on the speed difference between this target speed and the actual speed obtained from the output of the encoder 11, the proportional element 6f, the integral element 6g and the differential element 6h act to perform proportional, the integral and the differential operations, respectively, and based on the sum of results of these operations, the CR motor 4 is controlled. These proportional, integral and differential operations are conducted synchronously with the rising edge of the output pulse ENC-A of the encoder 11, for example. As a result, speed of the DC motor 4 is controlled to be a desired speed Ve. The predetermined speed Vc is preferably a value corresponding to 70 through 80% of the desired speed Ve.

From time t4, the DC motor 4 reaches the desired speed, and the carriage 3 also reaches the desired constant speed Ve and can perform printing.

When the printing is completed and the carriage 3 comes close to the target position (see time t5 in FIG. 8B), the positional difference becomes smaller, and the target speed also becomes slower. Therefore, the speed difference, i.e., the output of the subtracter 6e becomes a negative value, and the DC motor 4 is decelerated and stops at time t6.

However, the above-indicated conventional DC motor control method and control apparatus involved the problem that noise occurred at the engaging portion of gears upon the start of DC motor due to the backlash of gears of the DC motor and the cogging torque of the DC motor, for example. Details of that problem will be explained below.

First explained is the cogging torque of a DC motor and the backlash of gears of the DC motor, which invite that problem.

FIG. 9 is a graph showing relations between the cogging torque of a DC motor, in absolute value, and the phase of the armature (rotor) of the DC motor.

The magnitude of the cogging torque (absolute value) of the DC motor is as shown in FIG. 9 in which it periodically changes in response to the phase of the rotor of the DC motor and the position where the magnitude of the torque is minimum, which may be the point B, is the stability point. At the stability point, no torque either in the normal rotating direction or in the reverse rotating direction is produced in the rotor.

However, it is unstable at positions other than the stability point, and a torque tending to move to the stability point is produced. At any point of the graph where the gradient is negative, such as point P1, a normal rotating torque is produced. At any point of the graph where the gradient is positive, such as point P2, a reverse rotating torque is produced.

FIGS. 10A and 10B show is an explanatory diagram that schematically shows an aspect of the backlash of gears. Let the gear G1 be coupled to a rotor shaft and the gear G2 be driven by the gear G1.

FIG. 10A shows the gears at rest after the motor rotated in the normal direction. At rest after normal rotation of the motor, a tooth C1 of the gear G1 and a tooth C2 of the gear G2 are denting in contact with each other.

Engaged gears are normally provided with a backlash (play) between each tooth of one of the gears and each tooth of the other.

However, in the case where the supply of a DC current for driving the motor in the normal direction is stopped and the cogging torque generated at the rotor stops is the torque at point P2 of FIG. 9, a torque in the reverse rotating direction is produced in the rotor. Then, since there is the backlash at the engaging portion of the gear G1 and the gear G2, it brings about the phenomenon that the gear G1 rotates in the reverse direction within the extent allowed by the backlash.

As a result, as shown in FIG. 10B, a distance D is produced between the tooth C1 of the gear G1 and the tooth C2 of the gear G2. From this status, when the normal driving of the motor is resumed, followed by a general acceleration control, the tooth C1 of the gear G1 hard hits the tooth C2 of the gear G2, and generates noise such as "clank". Especially in offices and homes, printers used are required to operate silently. Therefore, such noise disturbs silence and has been recognized as a problem.

Even in the case where the rotor of the DC motor stops just at a stability point and no cogging torque occurs either in the normal direction or in the reverse direction, if the driving directions of the motor are opposite from each other between those before and after a stop, the same problem occurs upon the driving is started after the stop, due to the backlash of the gears.

FIG. 11 is a graph that shows in detail a motor current upon a start of the driving of the motor in the normal direction in conventional DC motor control method and control apparatus. The period TX in FIG. 11 is the acceleration control period, and the period TY is the PID control period. Here is made a detailed explanation particularly about the period TX.

A current Ith taken on the ordinate of the graph of FIG. 11 is the minimum current value required for the gear G1 to drive the gear G2 in FIGS. 10A and 10B. That is, the current Ith is the threshold current of a gear coupled to the rotor shaft to drive another gear in engagement with it.

In the conventional DC motor control method and control apparatus, at the start of acceleration control of the period TX, i.e. at the start of driving the motor in the normal direction, the initial value I1 of the DC current supplied to the motor was set in a value equal to or more than the threshold current Ith.

Therefore, when there was a gap D between the tooth C1 of the gear G1 and the tooth C2 of the gear G2 as shown in FIG. 10B due to the backlash of the gears of the DC motor and the cogging torque of the DC motor, for example, it invited the problem that the tooth C1 of the gear G1 hit hard the tooth C2 of the gear G2 and generated noise such as "clank".

Additionally, the control by the conventional DC motor control method and control apparatus involved a further problem shown below. The further problem will be specifically explained below.

FIGS. 12A and 12B are graphs that show the target speed and the current speed near a target stop position in the control by the conventional DC motor control method and control apparatus.

There were two possible target speed waveforms near the target stop position in the control by the conventional DC motor control method and control apparatus, namely, the first target speed waveform pattern shown in FIG. 12A and the second target speed waveform pattern shown in FIG. 12B.

However, in case of the first target speed waveform pattern, constant speed control of the target speed VC1 is not executed and the control directly shifts from the acceleration control to the deceleration control. Therefore, since the instruction speed changes very largely upon the shifting from the acceleration control to the deceleration control, behaviors of the motor to be controlled become significantly unstable, and in some cases may fall into uncontrollability. Further, since there is a certain limit to the motor speed, it is difficult to control the target speed VC1 between the current position and the target stop position to be linear always with a constant inclination. Therefore, controlling the target speed to have the waveform as the first target speed waveform pattern is not realistic.

On the other hand, in case of the second target speed waveform pattern, the maximum value V max of the motor speed is taken into consideration, and the control of the target speed VC2 shifts to the deceleration control after the constant speed control at the maximum speed V max. Even with this control pattern, the instruction speed changes largely upon the shifting from the constant speed control to the deceleration control, behaviors of the motor to be controlled become unstable as represented by the waveform of the current speed VP2 that is the actual motor speed, and it takes time for the motor to stabilize in behavior, and in some cases, may stop offset from the target stop position. Therefore, with the control of the target speed to have the waveform as the second target speed waveform pattern, precise control is difficult.

As discussed above, both speed control patterns near the target stop position in the conventional DC motor control method and control apparatus involved the problem, and it was difficult to precisely control the motor while maintaining stable behaviors of the motor to be controlled.

SUMMARY OF THE INVENTION

It is therefore the first object of the invention to provide a motor control method and a motor control apparatus that prevent noise at the engaging position of gears upon a start of driving the DC motor due to the backlash of the gears of the DC motor and the cogging torque of the DC motor, for example.

The motor control method according to the invention is characterized in supplying a DC motor for a predetermined time period upon starting the DC motor with a d.c. current as an initial value current, which is smaller than a d.c. current of a magnitude causing a tooth of a first gear coupled to a rotor shaft of the DC motor to generate a hitting noise when the tooth of the first gear gets into contact with a tooth of a second gear in engagement with the first gear. In other words, the method is characterized in supplying the DC motor with an initial value current for a predetermined time period upon a start of the DC motor, which is a d.c. current of a value less than the threshold current required for the first gear coupled to the rotor shaft of the DC motor to drive the second gear in engagement with the first gear. This arrangement prevents generation of noise caused by the backlash of the gears of the DC motor and the cogging torque of the DC motor, for example, upon a start of driving the motor.

The motor control apparatus according to the invention is characterized in comprising an initial value current supply instruction unit that generates and outputs an initial value current supply instruction signal that instructs to supply a DC motor for a predetermined time period upon starting the DC motor with a d.c. current as an initial value current, which is smaller than a d.c. current of a magnitude causing a tooth of a first gear coupled to a rotor shaft of the DC motor to generate a hitting noise when the tooth of the first gear gets into contact with a tooth of a second gear in engagement with the first gear. In other words, the apparatus is characterized in having an initial value current supply instruction unit that instructs supplying the DC motor with an initial value current for a predetermined time period upon a start of the DC motor, which is a d.c. current of a value less than the threshold current required for the first gear coupled to the rotor shaft of the DC motor to drive the second gear in engagement with the first gear. This arrangement prevents generation of noise caused by the backlash of the gears of the DC motor and the cogging torque of the DC motor, for example, upon a start of driving the motor.

The initial value current is preferably a d.c. current of a value enough to drive the first gear itself.

The predetermined period is preferably a period of time necessary and sufficient for bringing a tooth of the first gear into engagement with a tooth of the second gear in the direction for the first gear to drive the second gear, which is determined based on the value of the initial value current.

The DC motor is preferably a paper transport motor, carriage motor or paper feeding motor of a printer.

The second object of the invention is to provide a motor control method and a motor control apparatus enabling precise control while maintaining stable behaviors of the motor during deceleration control.

The motor control method according to the invention is characterized in generating in a deceleration control period a waveform pattern of a target speed VC expressed by $$VC = V\max\{1-(x/N)^a\} \text{ (a is an arbitrary constant)}$$

where V max is the maximum speed of a motor to be controlled, N is the distance of each deceleration control period from a start position of a deceleration control period to a target stop position, and x is the distance from the start position of the deceleration control period to a current position, and for executing deceleration control of the motor in accordance with the waveform pattern of the target speed VC. With this arrangement, since the waveform of the target speed VC changes gently, the motor can be controlled precisely while continuously stabilizing behaviors of the motor during deceleration control.

The motor control apparatus according to the invention is characterized in comprising: a speed instruction unit that generates in a deceleration control period a waveform pattern of a target speed VC expressed by $$VC = V\max\{1-(x/N)^a\} \text{ (a is an arbitrary constant)}$$

where V max is the maximum speed of a motor to be controlled, N is the distance of each deceleration control period from a start position of a deceleration control period to a target stop position, and x is the distance from the start position of the deceleration control period to a current position, and generates and outputs a speed instruction signal that instructs a target speed VC based on the waveform pattern of the target speed VC. With this arrangement, since the waveform of the target speed VC changes gently, the moor can be controlled precisely while continuously stabilizing behaviors of the motor during deceleration control.

The value of the arbitrary constant a may be set in each deceleration control period in response to values of the maximum speed V max of the motor, distance N of the deceleration control period and time of the deceleration control period, or may be set in a constant value.

The deceleration control may be applied to one of both of the deceleration control of the normal driving of the motor and the deceleration control of the reverse driving of the motor.

The motor may be any of a DC motor, stepping motor or AC motor.

Further, the motor may be a carriage motor or a paper transport motor of a printer.

The recording medium of a computer program according to the invention is characterized in having recorded a computer program for executing one of the motor control methods according to the invention on a computer system.

BRIEF DESCRIPTION OF THE DRAWINGS

FIGS. 8A and 8B are graphs that show a motor current and a motor speed of a CR motor 4 controlled by the DC unit 6;

DETAILED DESCRIPTION OF THE PREFERRED EMBODIMENTS

With reference to the drawings, explained below are embodiments of the motor control method, motor control apparatus and the recording medium having recorded a computer program for executing the motor control method according to the invention.

Figure 13:
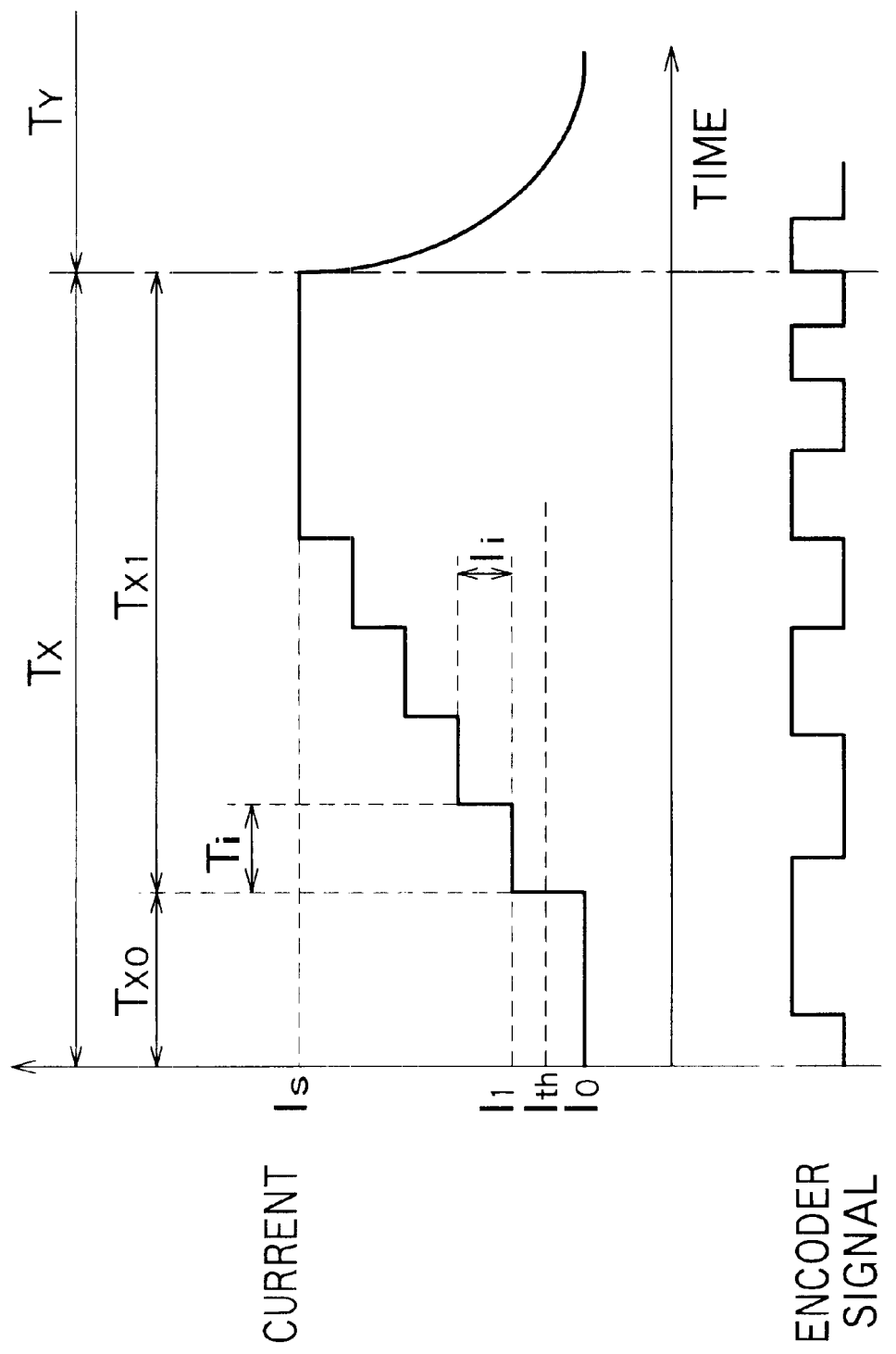
FIG. 13 is a graph that shows details of a motor current at a start of normal driving of a motor in a motor control method and a motor control apparatus according to the invention.

FIG. 13 is a graph that shows details of a motor current at a start of normal driving of a motor in a motor control method and a motor control apparatus according to the first embodiment of the invention. FIG. 13 is intended to be compared with FIG. 11 that shows the conventional technique, and here again, the period TX is an acceleration control period, the period TY is a PID control period, and here is made a detailed explanation particularly about the period TX.

Figure 10B:
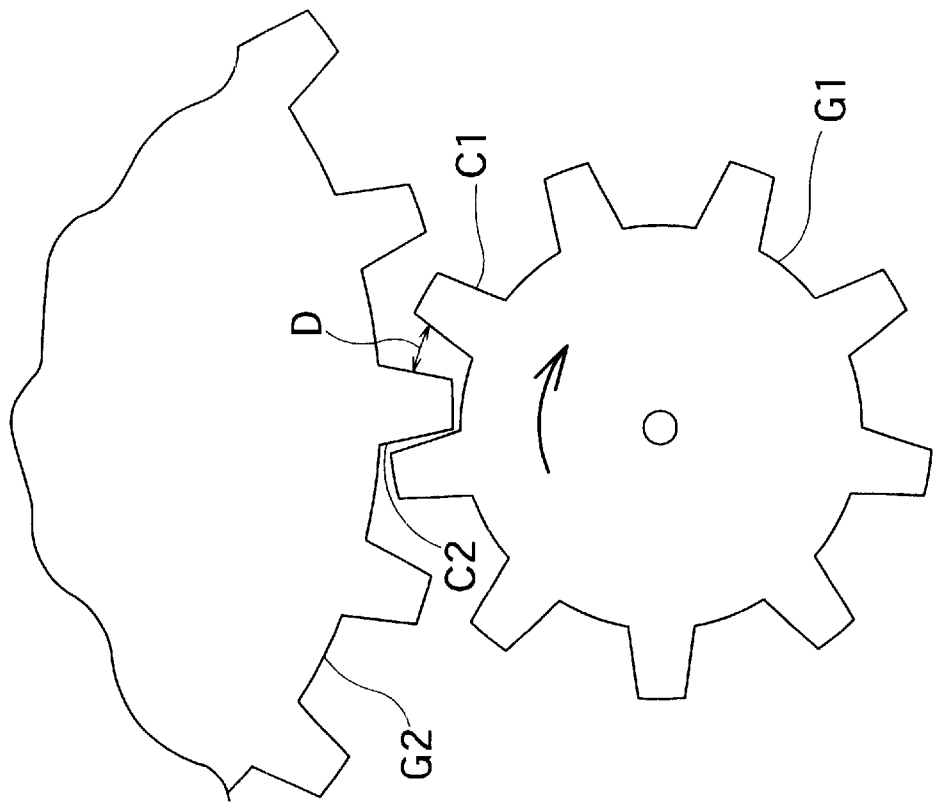
FIGS. 10A and 10B are explanatory diagrams that schematically illustrate an aspect of a backlash of gears.
Figure 10A:
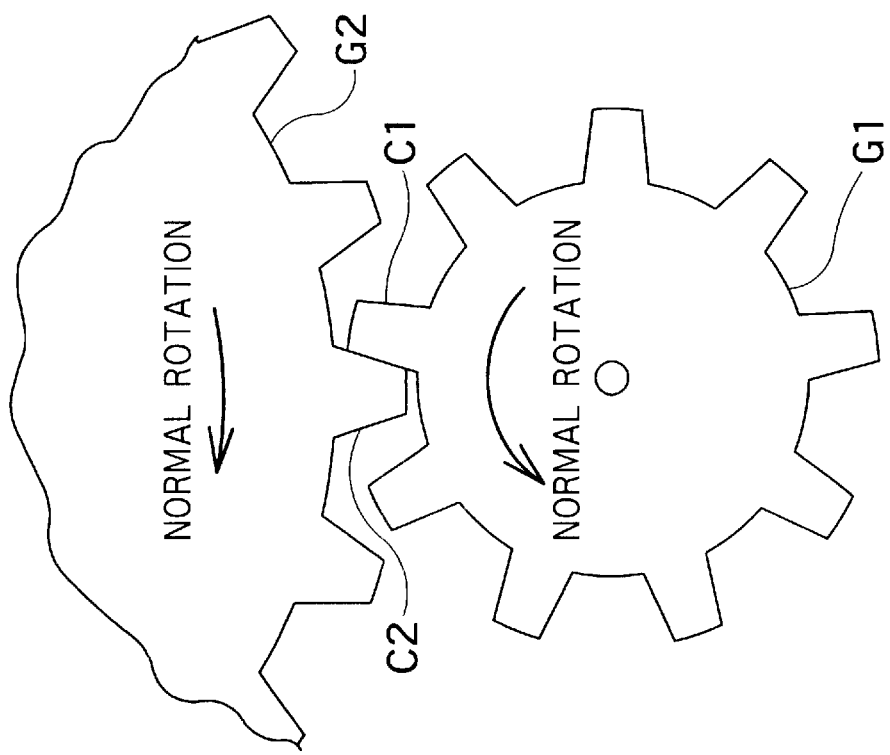
Figure 11:
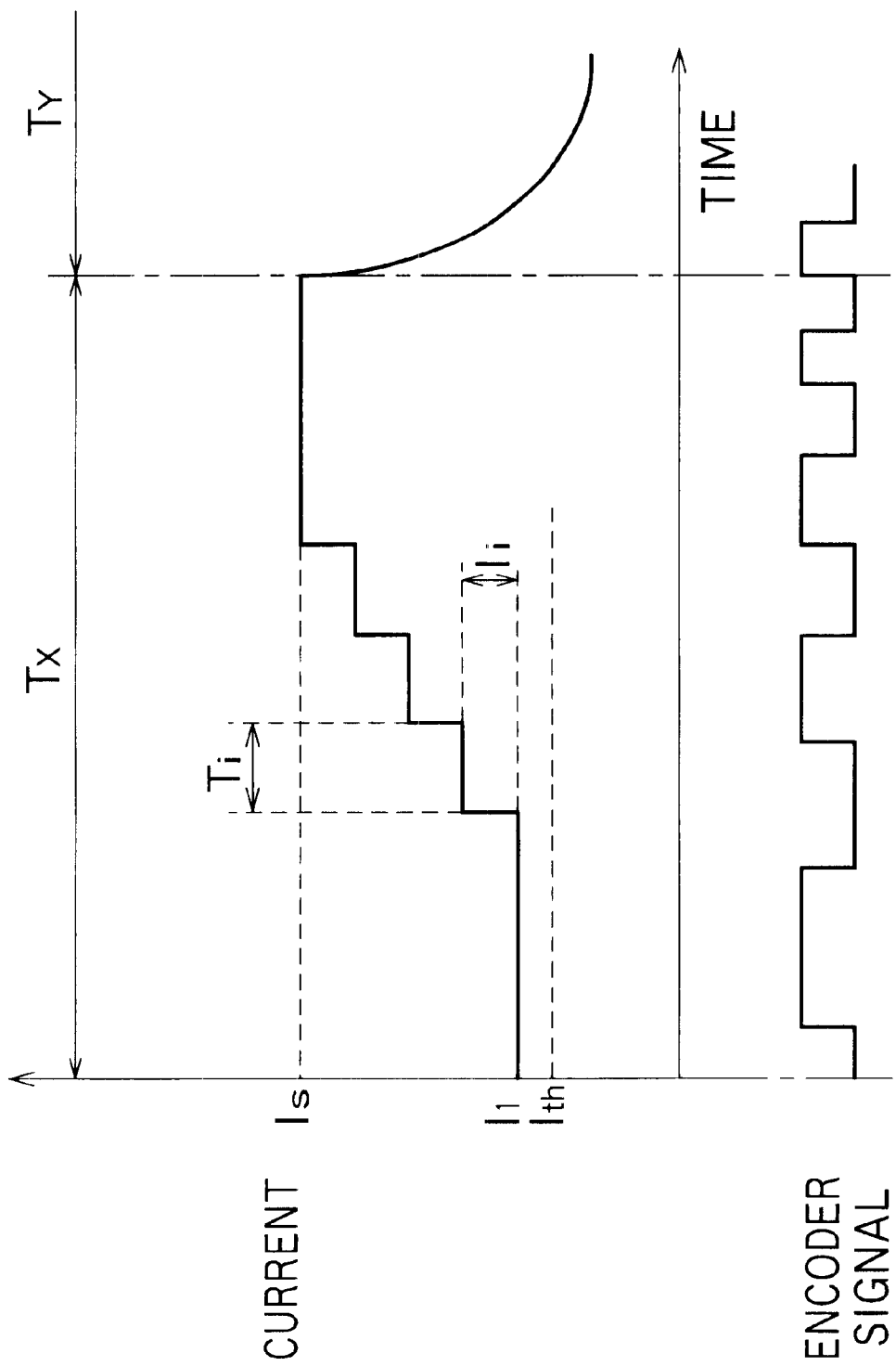
FIG. 11 is a graph that shows details of a motor current at a start of normal driving of a motor in a conventional DC motor control method and a conventional DC motor control apparatus.

Similarly to FIG. 11, a current Ith taken on the ordinate of the graph of FIG. 13 is the minimum current value required for the gear G1 to drive the gear G2 in FIGS. 10A and 10B. That is, the current Ith is the threshold current of a gear coupled to the rotor shaft to drive another gear in engagement with it.

As already explained, the conventional DC motor control method and control apparatus were configured to supply the motor with a voltage of a value equal to or more than the threshold current Ith as the initial value I1 of the d.c. current upon the start of acceleration control of the period TX, namely, at a start of driving the motor, and involved the problem of noise caused by the backlash of gears of the DC motor and the cogging torque of the DC motor, for example.

Taking this problem into consideration, the motor control method and the motor control apparatus according to the first embodiment of the invention is configured to set the initial value I0 of the d.c. current supplied to the motor in a value below the threshold value upon a start of driving the motor. This is one of the most unique points of the motor control method and the motor control apparatus according to the first embodiment of the invention.

Explanation will be made about the principle of the motor control method and the motor control apparatus according to the first embodiment of the invention to solve the problem involved in the conventional technique, with reference to FIG. 13 and FIGS. 10A and 10B.

If the initial value I0 of the d.c. current supplied to the motor at a start of driving the motor is below the threshold current Ith, then the gear G1 coupled to the rotor shaft cannot drive the gear G2 in engagement therewith while the initial value current I0 is supplied from the start of the motor. The initial value current I0, however, is a current value sufficient for driving the gear G1 solely when the gear G1 is not engagement with another gear.

Therefore, even when the gear G1 is engaged with the gear G2, if there is a gap D between the tooth C1 of the gear G1 and the tooth C2 of the gear G2 as show in FIG. 10B because of the backlash of gears and the cogging torque of the DC motor, or for any other reason, the gear G1, when supplied with the initial current value I0, can rotate until its tooth C1 gets in contact with the tooth C2 of the gear G2. Since the current supplied here is the initial value current I0, which is a small current below the threshold current Ith, the tooth C1 of the gear G1 contacts the tooth C2 of the gear G2 with a moderate urging force. That is, the tooth C1 of the gear G1 does not hard hit the tooth C2 of the gear G2, and does not produce noise like "clank".

Therefore, the initial current value I0 used in the motor control method and the motor control apparatus according to the first embodiment of the invention can be expressed, in other words, as a d.c. current smaller than a d.c. current of a magnitude causing a tooth of the gear G1 coupled to the rotor shaft of the DC motor to engage a tooth of the gear G2 with an impulse generating a hitting noise.

Period of time for supplying the initial value current I0 from a start of the motor is the initial period TX0 of the period TX that is the acceleration control period. Even when the distance D existing between the tooth C1 of the gear G1 and the tooth C2 of the gear G2 is the maximum value thereof, length of the period TX0 is appropriately set on the basis of the initial value I0 as a period of time necessary and sufficient for the tooth C1 of the gear G1 to get into contact with the tooth C2 of the gear G2.

After the period TX0, the time progresses to the remainder period TX1 of the period TX, and normal acceleration control takes place. For example, the d.c. current I1 equal to or more than the threshold current Ith is supplied just for the period Ti, and thereafter, the supplied current is increased by a predetermined value Ii every time when each period Ti passes. After all of the period TX passes, the time progresses to the period TY, and normal PID control takes place.

Hardware configuration of the motor control apparatus according to the first embodiment of the invention is substantially similar to the configuration of the DC unit that is a conventional DC motor control apparatus. However, the motor control apparatus according to the first embodiment of the invention is different in having the above-explained control regarding the supply of the initial value current.

Figure 7:
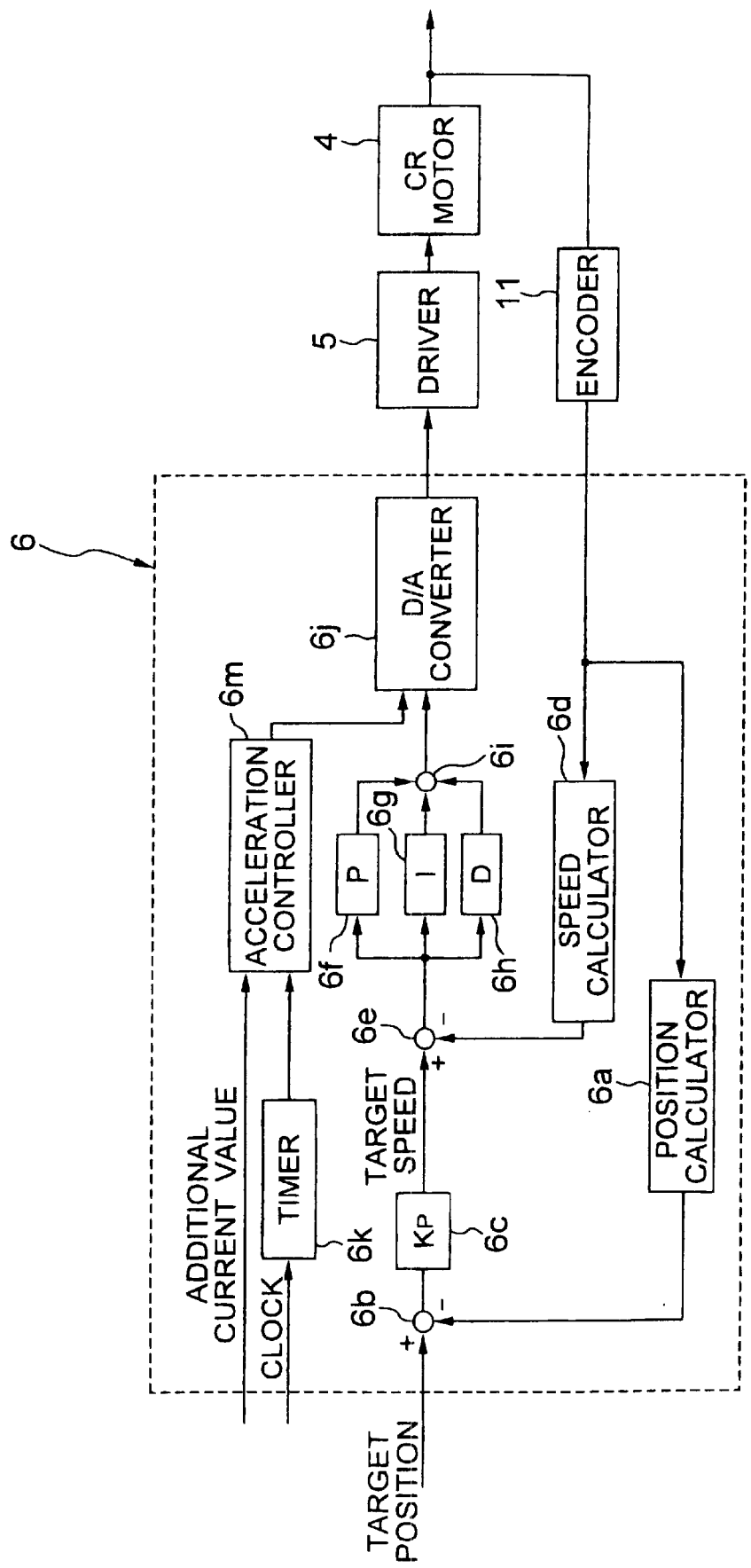
FIG. 7 is a block diagram that shows configuration of a DC unit 6, which is a conventional DC motor control apparatus.
Figure 9:
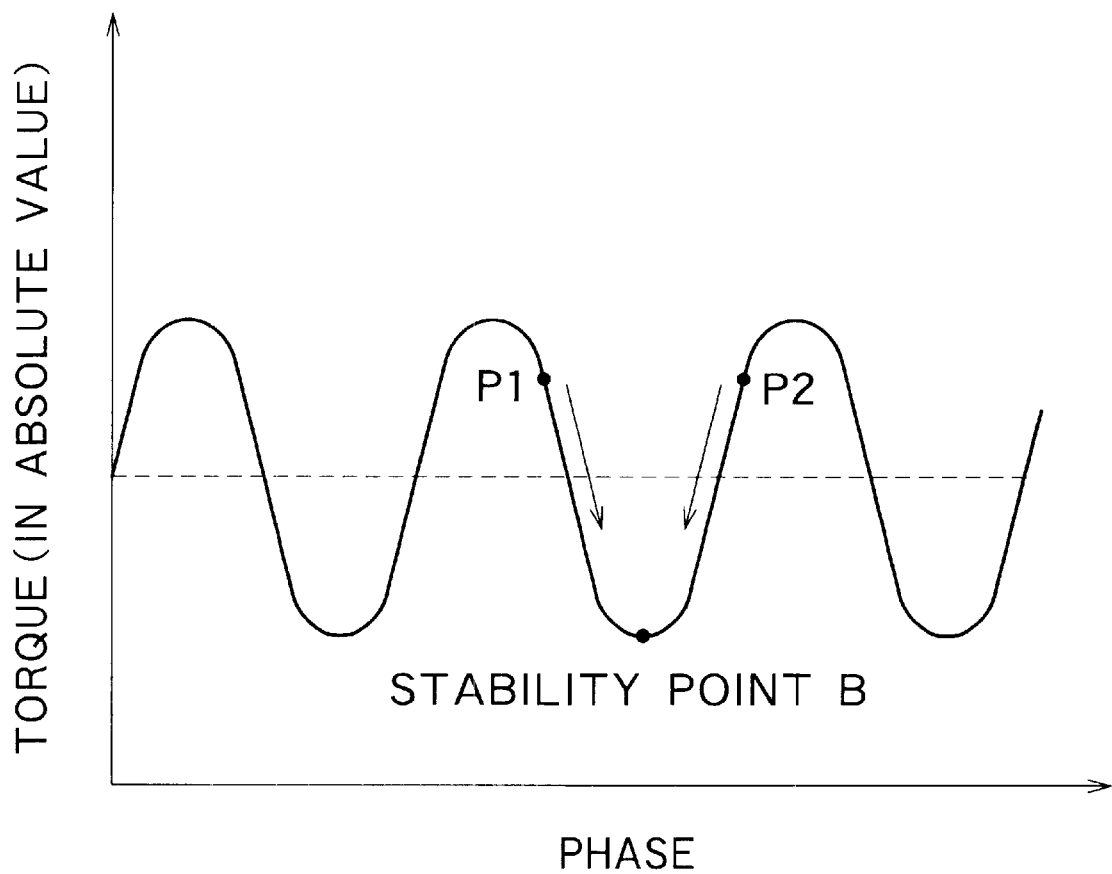
FIG. 9 is a graph that shows relations between the absolute value of the cogging torque of a DC motor and the phase of an armature (rotor)

The motor control apparatus according to the first embodiment of the invention is configured and set up to generate and output an initial value current supply instruction signal that instructs to supply the motor with the initial value current I0 just for the period TX0 determined on the basis of the initial value current I0 as explained above at a start of driving the motor, under the control by the acceleration controller 6m shown in FIG. 7. The period TX0 is measured based on a timer interrupt signal from a timer 6k.

The initial value current supply instruction signal is sent to the D/A converter 6j and converted into an analog current. Based on the analog current, the driver 5 drives the DC motor (CR motor) 4.

The motor to be controlled by the motor control method and the motor control apparatus according to the first embodiment of the invention is a DC motor. In case the motor control method and the motor control apparatus according to the first embodiment of the invention is used in a printer, the DC motor to be controlled may be any of a paper supply motor for dispensing recording paper set in the printer, a paper feed motor for transporting paper during printing, or a carriage motor for driving the carriage.

In case the DC motor to be controlled is one of the paper supply motor, the carriage motor or the paper feed motor of a printer, adequate material of gears of the DC motor may be, for example, polyacetal or POM (polyoxymethylene). Regarding the grade of the gears, there are typically two grades, standard grade and slide grade. Here is preferably employed the standard grade of gears.

The motor control method and the motor control apparatus according to the invention are applicable both at the start of normal driving of the motor and at the start of the reverse driving thereof.

Next explained are a motor control method and a motor control apparatus according to the second embodiment of the invention with reference to the drawings.

In deceleration control periods, the motor control method and the motor control apparatus according to the second embodiment of the invention generates a waveform pattern of the target speed VC expressed by the following equation:

$$VC = V\max\{1-(x/N)^a\} \text{ (a is an arbitrary constant)} \quad (1)$$

where V max is the maximum speed of the motor to be controlled, N is the distance of each deceleration control period from a start position of a deceleration control period to a target stop position, and x is the distance from the start position of the deceleration control period to a current position, and they executes deceleration control of the motor in accordance with the waveform pattern of the target speed VC. This is the most important feature of the motor control method and the motor control apparatus according to the second embodiment of the invention.

Figure 14:
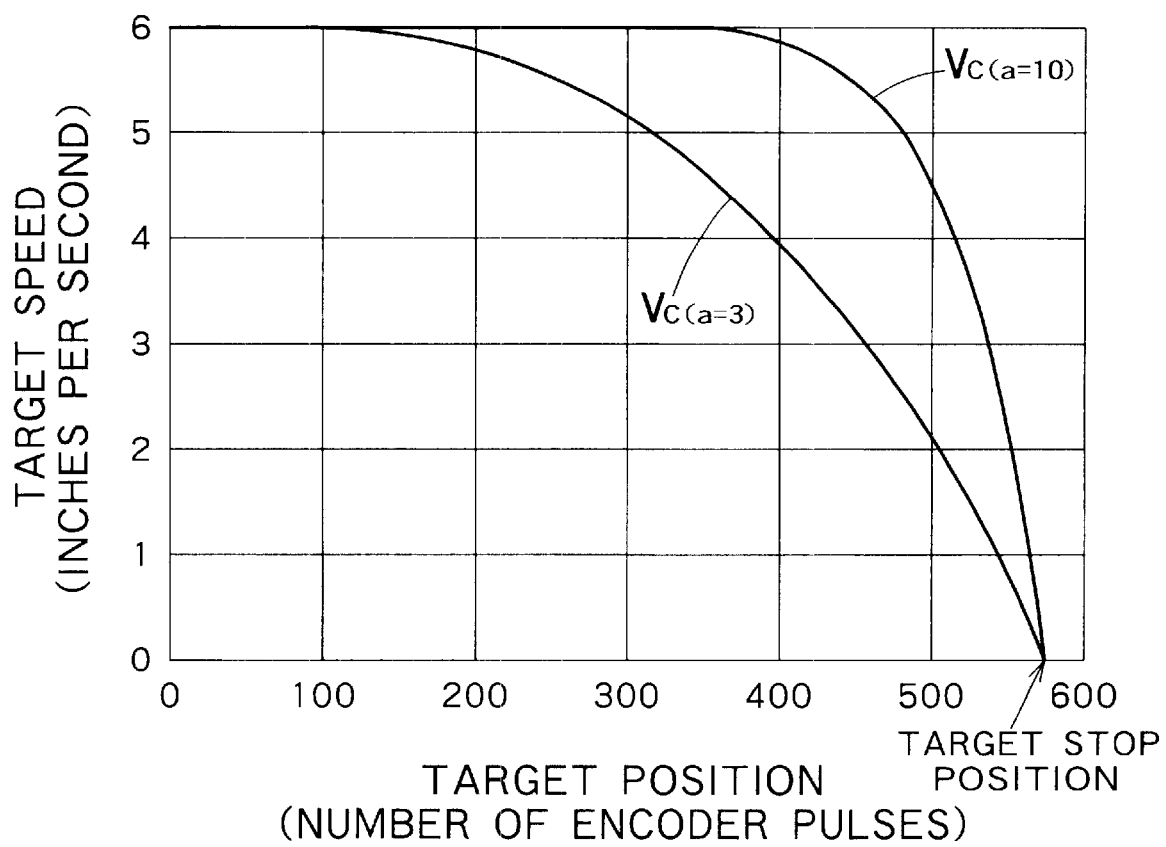
FIG. 14 is a graph that shows waveform patterns of target speeds VC generated by a motor control method and a motor control apparatus according to the invention.

FIG. 14 is a graph that shows waveform patterns of target speeds VC generated by a motor control method and a motor control apparatus according to the second embodiment of the invention.

In the example shown in the graph of FIG. 14, the distance N of the deceleration control period is 576 (number of encoder pulses), the maximum speed V max of the motor is 6 (inches per second), and a waveform pattern of a target speed VC (a=3) having the constant a being 3 and a waveform pattern of a target speed VC (a=10) having the constant a being 10 are illustrated.

It will be appreciated from the graph of FIG. 14 that the waveform pattern of the target speed VC with the smaller value of the arbitrary constant a changes more gently, and it facilitates stabilization of behaviors of the motor, and hence enables precise control.

Figure 15:
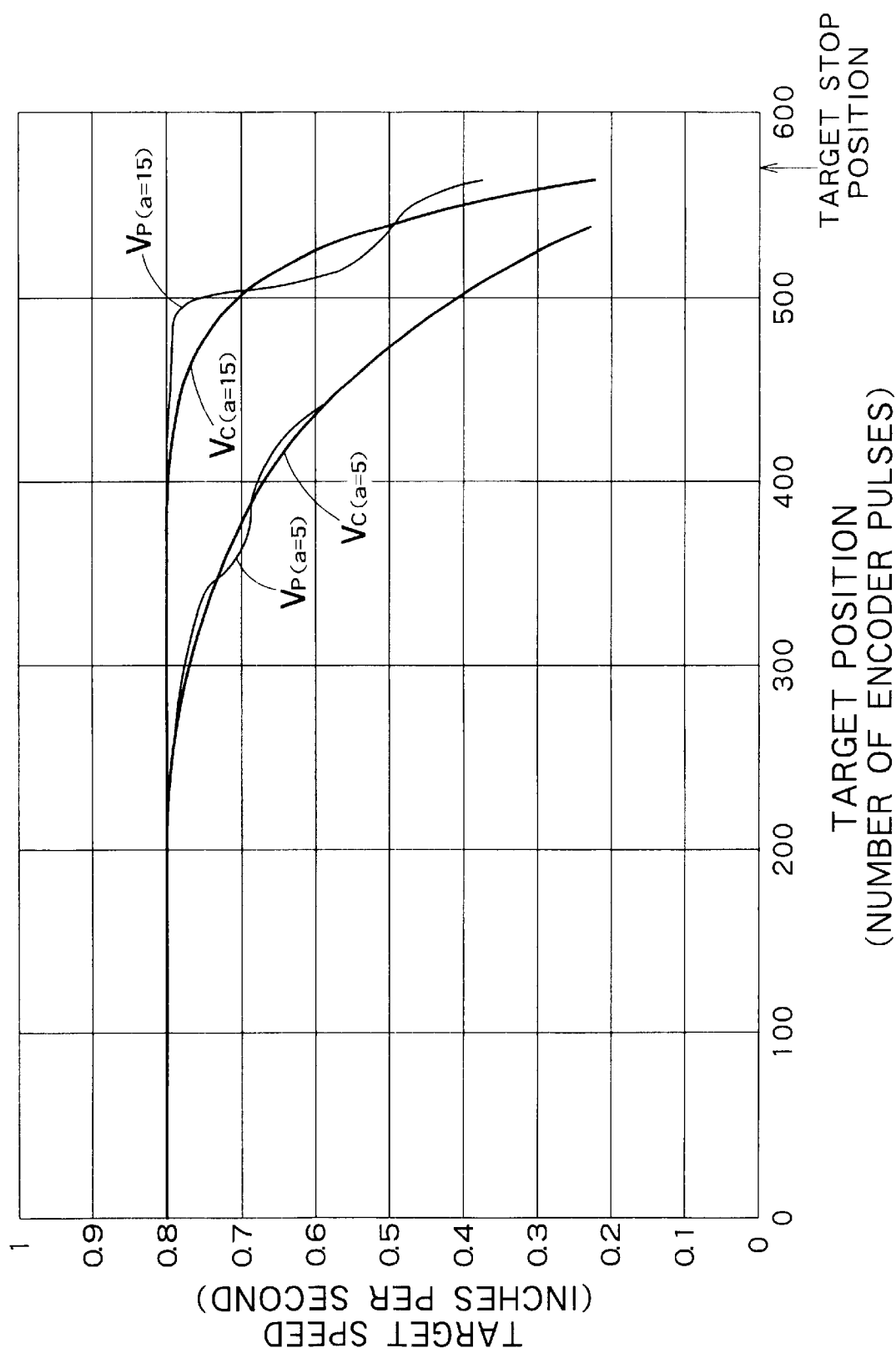
FIG. 15 is a graph that shows waveform patterns of target speeds VC and current motor speeds VP generated by a motor control method and a motor control apparatus according to the invention.

FIG. 15 is a graph that shows waveform patterns of target speeds VC and current motor speeds VP generated by a motor control method and a motor control apparatus according to the second embodiment of the invention.

In the example shown in the graph of FIG. 15, the distance N of the deceleration control period is 576 (number of encoder pulses), the maximum speed V max of the motor is 0.8 (inches per second), and a waveform pattern of a target speed VC (a=5) having the constant a being 5 and a waveform pattern of a target speed VC (a=15) having the constant a being 15 are illustrated.

It will be appreciated from the graph of FIG. 15 that the waveform pattern of the target speed VC with the smaller value changes more gently, and amplitude of the current speed VP of the motor relative to the target speed VC is small, and the motor is stable in behaviors. Therefore, it is more advantageous to use a smaller value as the arbitrary constant a to facilitate stabilization of the motor behaviors and perform precise control.

The value of the arbitrary constant a, however, may be set for each deceleration control period in accordance with values of the maximum speed V max of the motor, distance N of the deceleration control period, duration of time of the deceleration control period. For example, for reducing the duration of time of each deceleration control period, value of the constant a may be increased within the extent capable of maintaining stable behaviors of the motor, and the value of the constant a may be decreased when more precise control is desired. Alternatively, if it is confirmed by simulation, for example, that behaviors of the motor can be maintained stable, the arbitrary constant a may be fixed at a constant value.

Figure 12A:
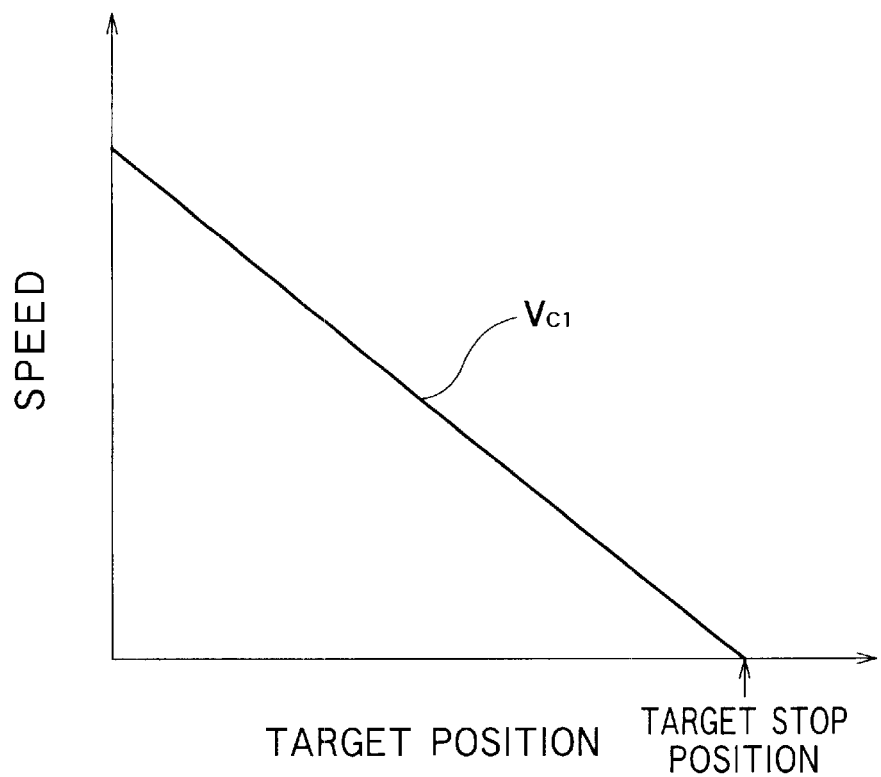
FIGS. 12A and 12B are graphs that show a target speed and a current speed near a target stop position in control by a conventional DC motor control method and apparatus.
Figure 12B:
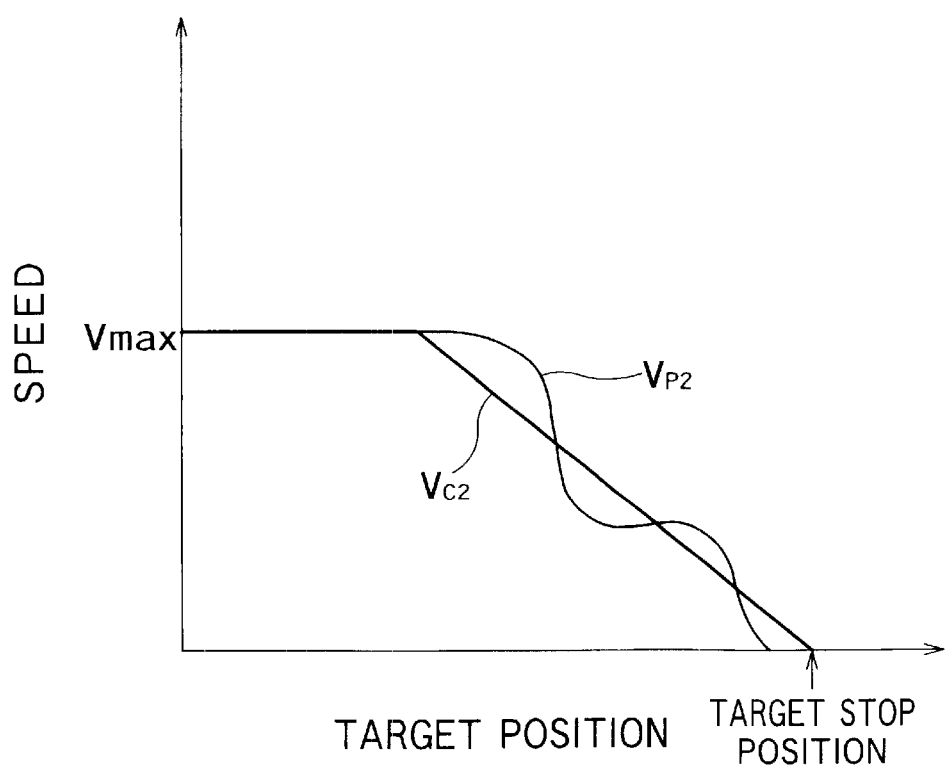

Referring to FIG. 15 and FIGS. 12A and 12B to compare the motor control method and the motor control apparatus according to the second embodiment of the invention with the conventional technique regarding the amplitude of the current speed VP of the motor relative to the target speed VC, the amplitude is smaller in the present invention. Therefore, the motor control method and the motor control apparatus according to the second embodiment of the invention can control the motor more precisely while stabilizing the motor in behaviors.

The motor control device according to the second embodiment of the invention generates a waveform pattern of a target speed VC as explained above, and includes a speed instruction unit for generating and outputting a speed instruction signal that instructs the target speed VC based on the waveform pattern of the target speed VC. Thereby, the motor control apparatus functions for deceleration control of the motor. Alternatively, a waveform pattern table of target speeds VC may be previously provided in ASIC, PROM, RAM, EEPROM or other storage means to previously store one or more waveform patterns, thereby to allow the speed instruction unit to refer the waveform pattern table to generate and output a speed instruction signal that instructs a target speed VC.

Further, the motor control method and the motor control apparatus according to the second embodiment of the invention can be used as the control method and the control apparatus of any of DC motor, stepping motor or AC motor.

Figure 1:
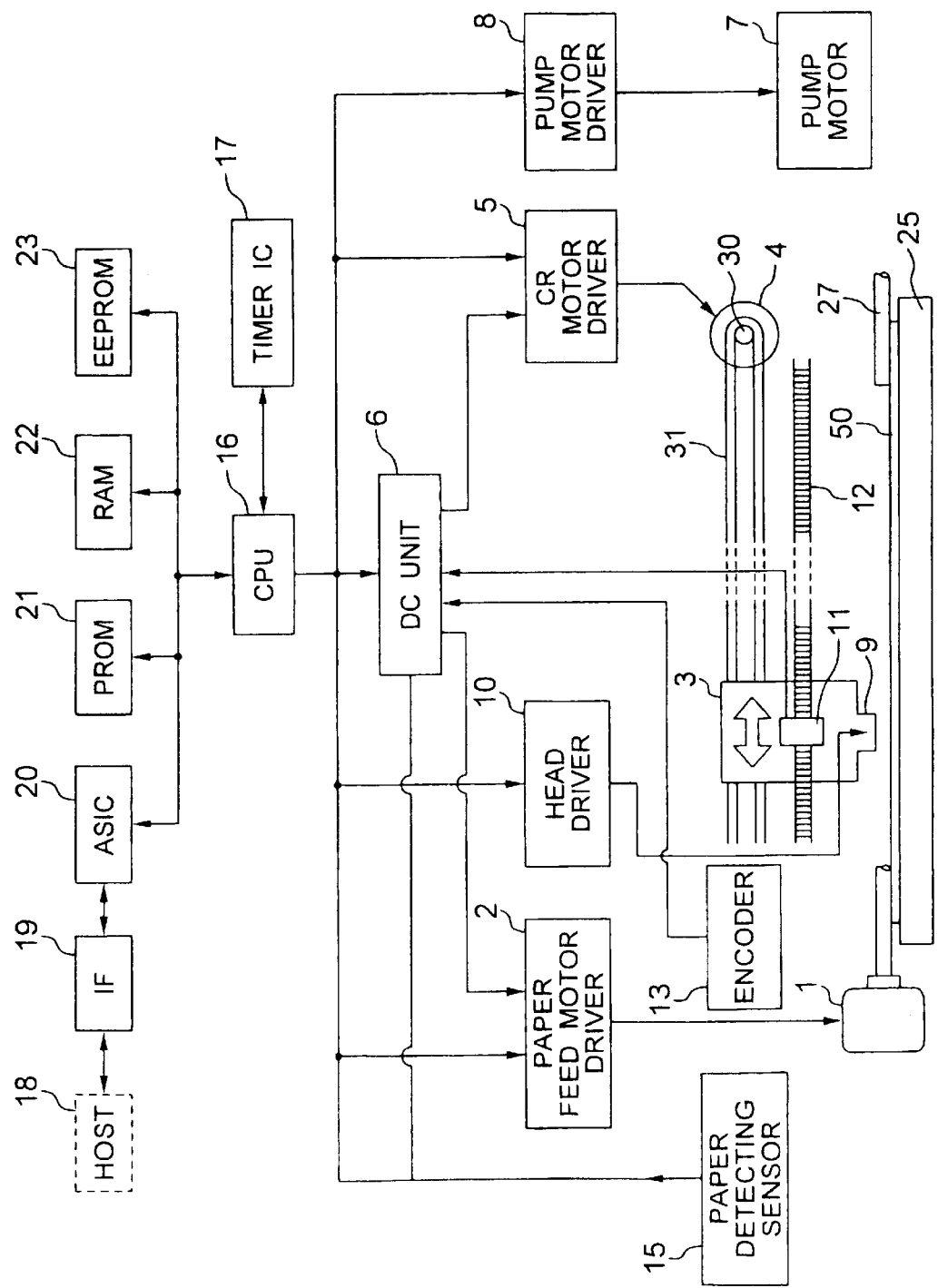
FIG. 1 is a block diagram that generally shows configuration of an ink jet printer.
Figure 2:
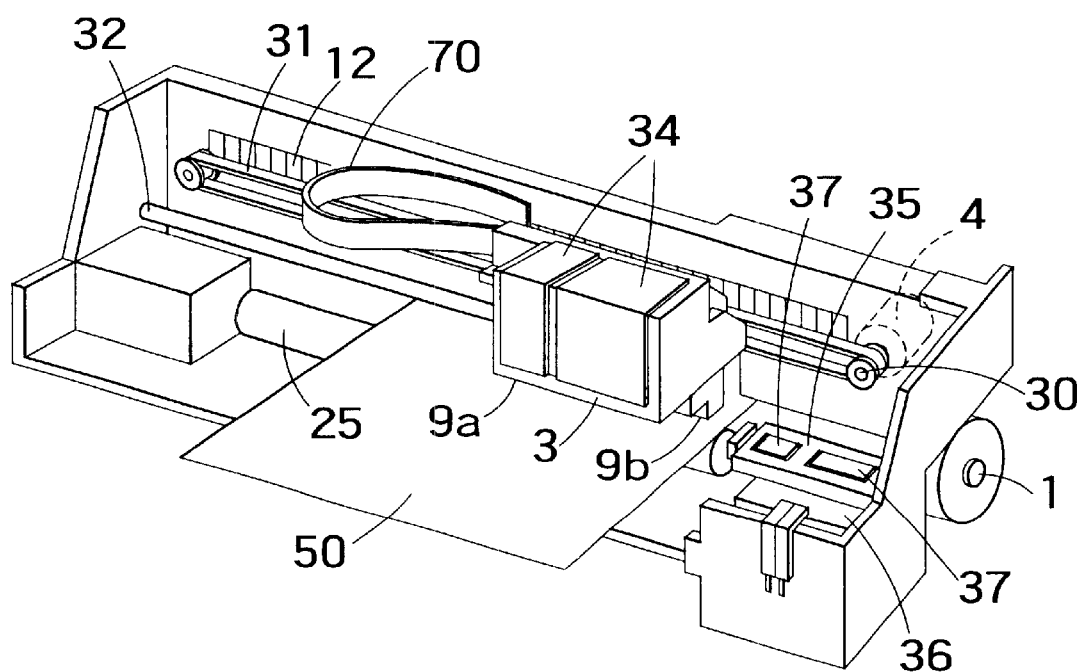
FIG. 2 is a perspective view that shows configuration of a carriage 3 and its periphery of an ink jet printer.
Figure 3:
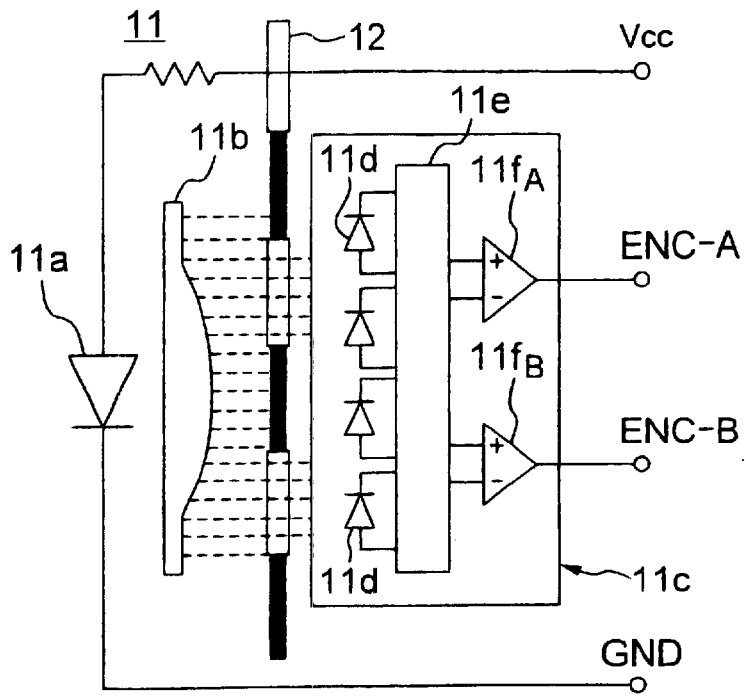
FIG. 3 is an explanatory diagram that schematically shows configuration of a linear encoder 11 attached to the carriage 3.
Figure 4A:
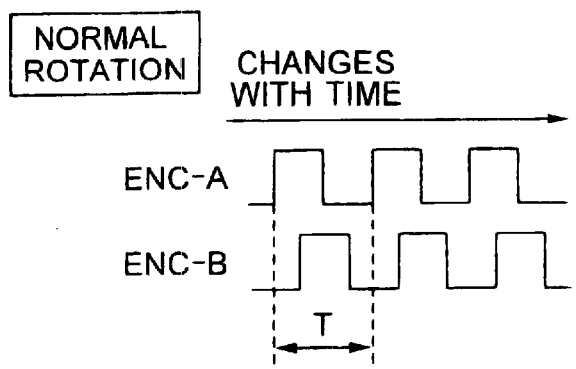
FIGS. 4A and 4B are timing charts that show waveforms of two output signals from the encoder during normal rotation of a CR motor and during reverse rotation of the same.
Figure 4B:
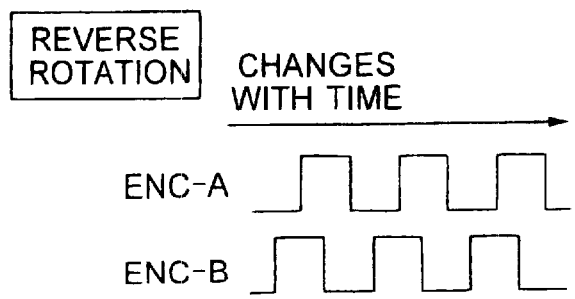
Figure 5:
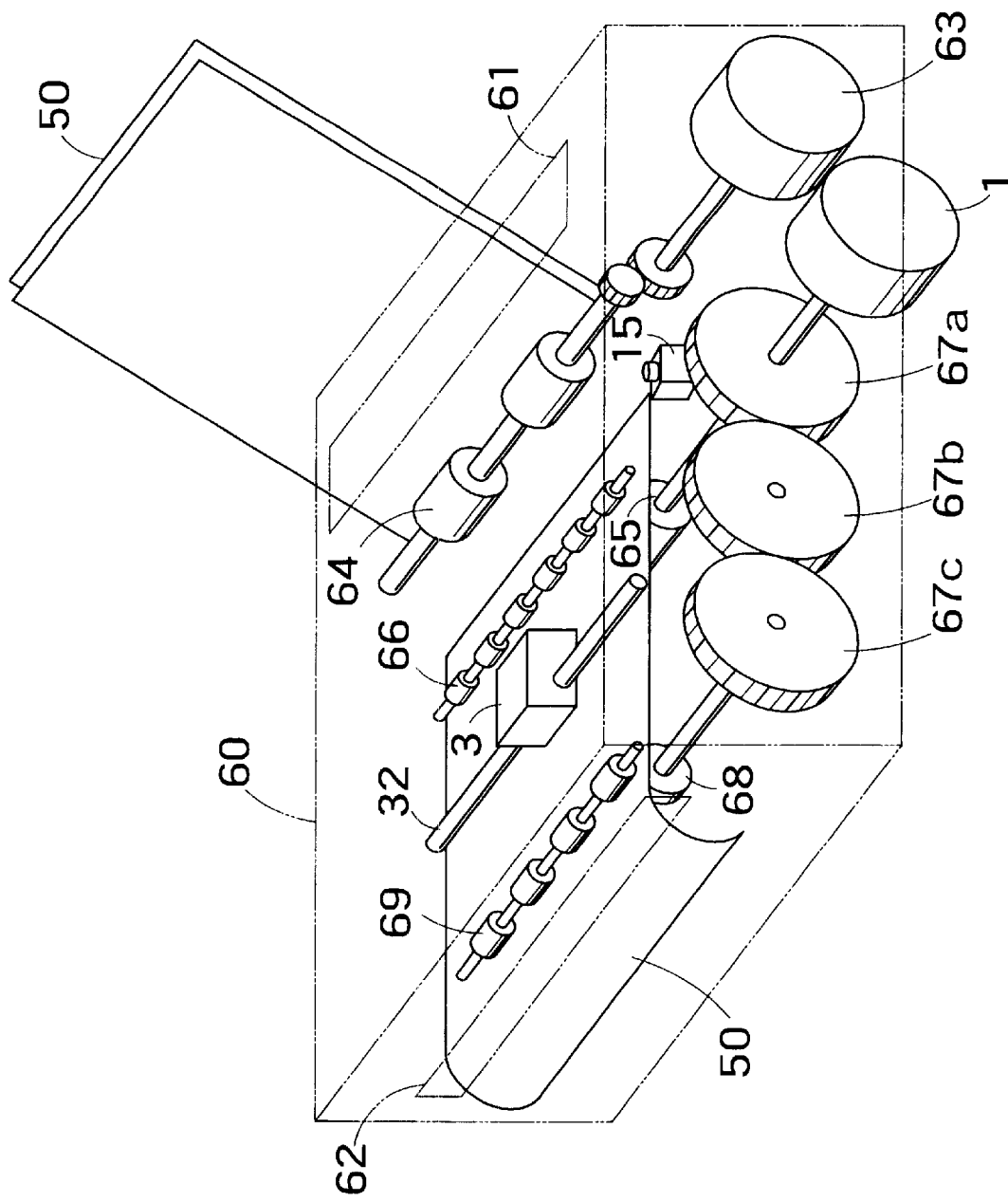
FIG. 5 is a perspective view that shows components related to feeding and detection of paper.
Figure 6:
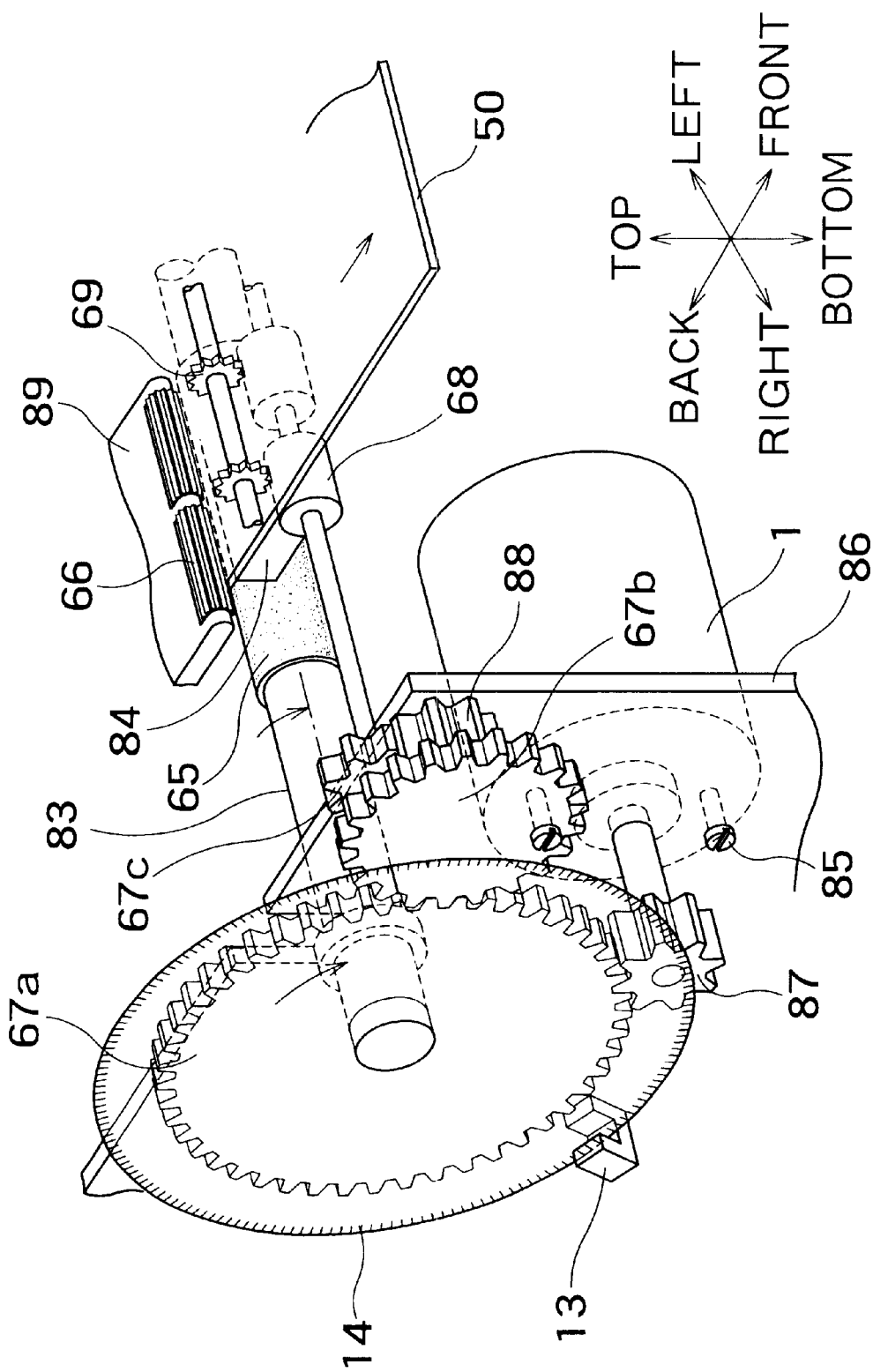
FIG. 6 is a perspective that shows details of components related to feeding of paper of a printer.

If the motor to be controlled is a DC motor, then the hardware configuration of the motor control apparatus according to the second embodiment of the invention will be substantially the same as the configuration of the DC unit 6, which is the conventional motor control apparatus, but it is different in enabling the above-explained deceleration control. In this case, the motor control apparatus according to the second embodiment of the invention is configured and set up to generate a waveform pattern of a target speed VC as explained above in the acceleration controller 6m shown in FIG. 7 and to generate and output a speed instruction signal which instructs to supply the motor with a current in accordance with the waveform pattern of the target speed VC. Alternatively, a waveform pattern table of target speeds VC may be previously provided in ASIC 20, PROM 21, RAM 22, EEPROM 23, shown in FIG. 3, or other storage means to previously store one or more waveform patterns, thereby to allow the acceleration controller 6m shown in FIG. 7 to refer the waveform pattern table to generate and output a speed instruction signal that instructs a target speed VC. In this case, the acceleration controller 6m refers to the waveform pattern table by accessing to one of ASIC 20, PROM 21, RAM 22 or EEPROM 23 via CPU 16. In case the waveform pattern table is provided in another storage means, the acceleration controller 6m may be configured to directly access to that storage means to refer the waveform pattern table.

In case the motor control method and the motor control apparatus according to the second embodiment of the invention are used in a printer, the motor to be controlled may be a paper feeding motor or a carriage motor. In this case, the constant a can be designed to be varied in accordance with the weight of ink, recording media and the frequency of use of the printer, for example.

Additionally, the motor control method and the motor control apparatus according to the second embodiment of the invention are applicable either during deceleration of the normal rotation of the motor or during deceleration of the reverse rotation. If the maximum speed of the motor in Equation (1) expressing the target speed VC is a value including the sign corresponding to the rotating direction, then the Equation (1) is applicable unchanged also for deceleration control during driving in the reverse direction.

Figure 16:
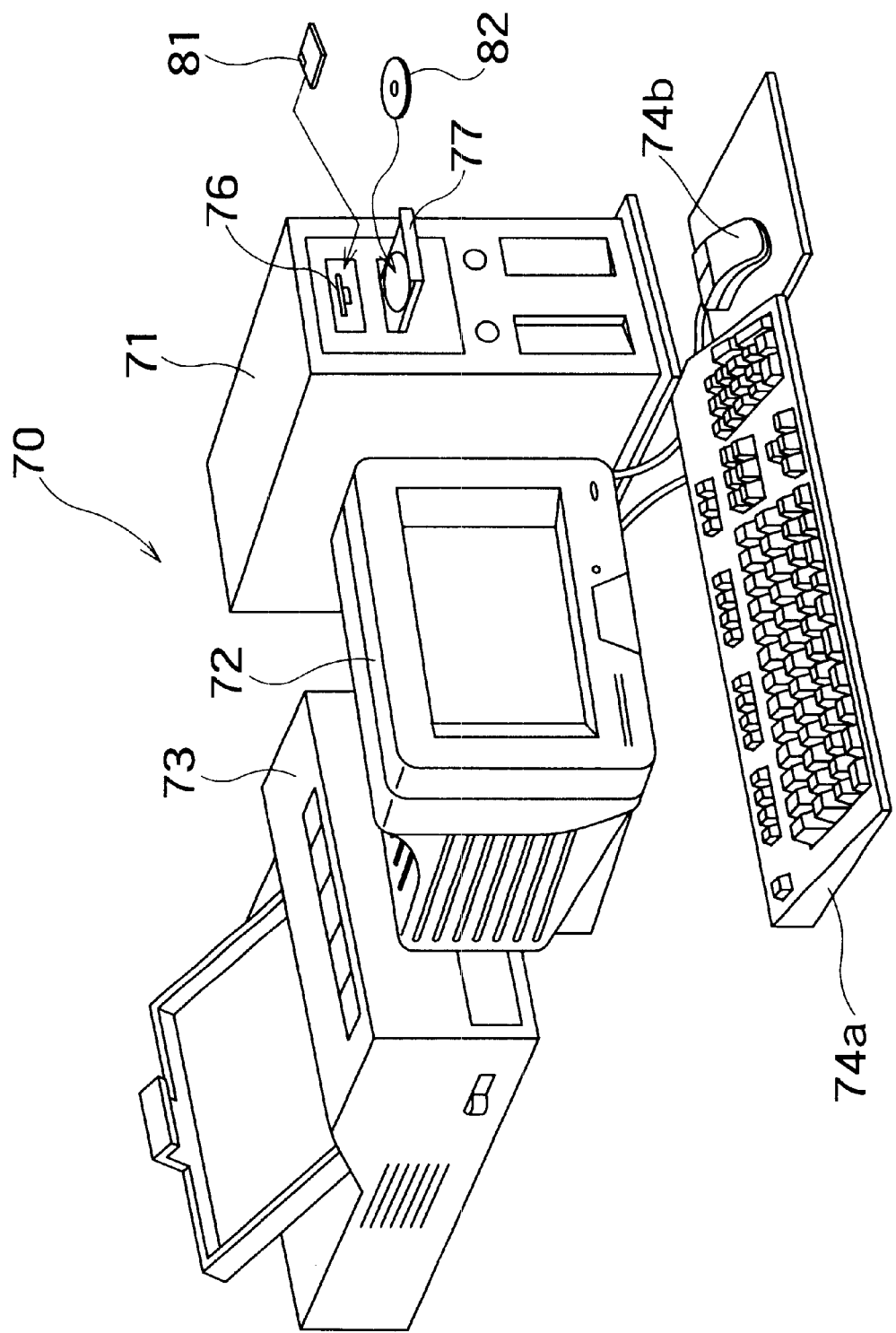
FIG. 16 is an explanatory diagram that shows an outer aspect of configuration of a recording medium having recorded a program for executing a motor control method according to the invention and a computer system in which the recording medium is used.
Figure 17:
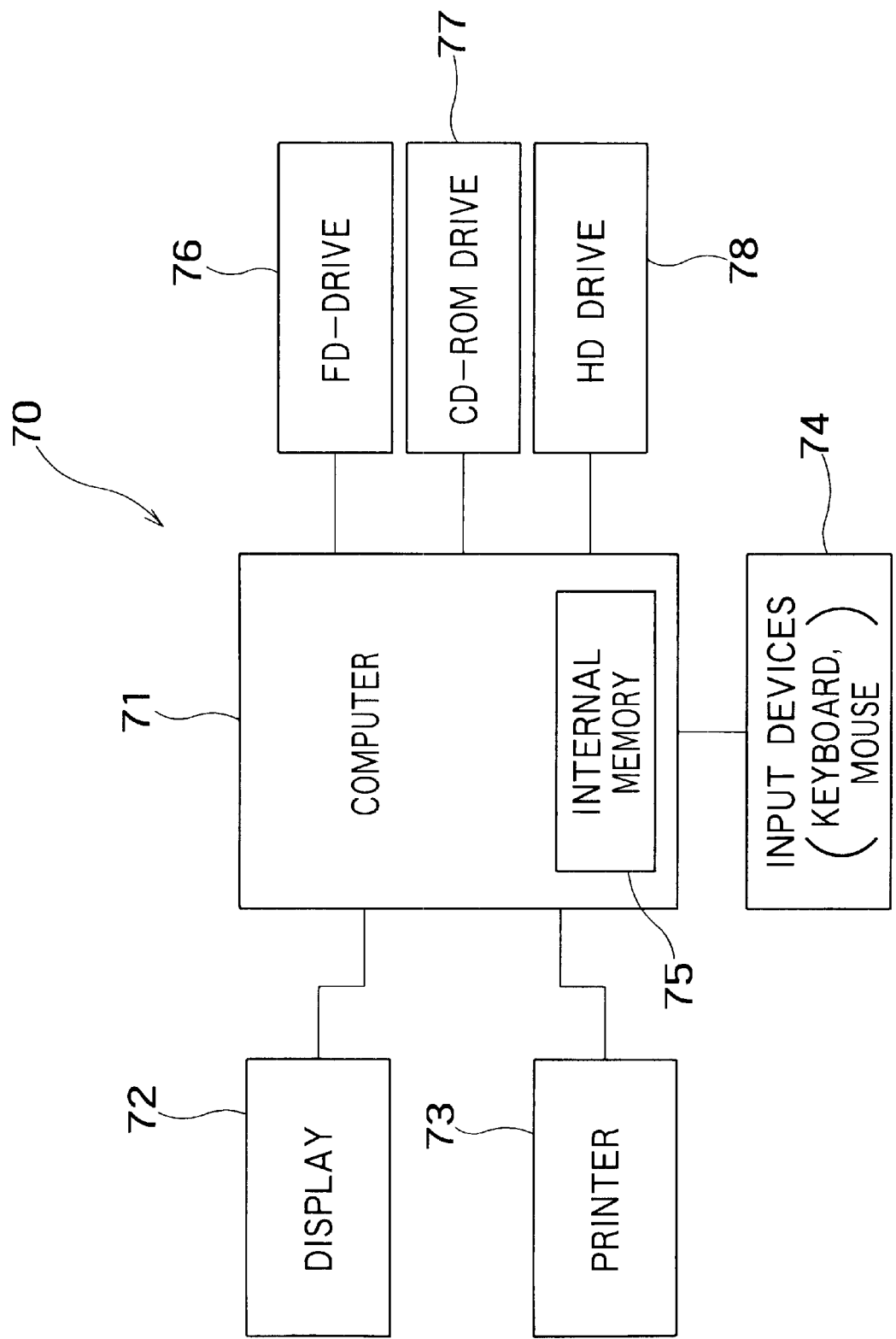
FIG. 17 is a block diagram that shows configuration of the computer system shown in FIG. 16.

FIG. 16 is an explanatory diagram that shows a recording medium having recorded a computer program for executing the motor control method according to the invention, and an outer appearance of a computer system in which the recording medium is sued. FIG. 17 is a block diagram that shows configuration of the computer system shown in FIG. 16.

The computer system 70 shown in FIG. 16 is made up of a computer main body 71 housed in a casing like a mini tower, for example, a display 72 such as CRT (cathode ray tube), plasma display, liquid crystal display, or the like, a printer 73 as a record output apparatus, a key board 74a and a mouse 74b as input devices, a flexible disk drive 76, and a CD-ROM drive 77. FIG. 17 illustrates configuration of the computer system 70 as a block diagram, and the casing that houses the computer main body 71 further contains internal memory 75 such as RAM (random access memory), for example, and external memory like a hard disk drive unit 78, for example. The recording medium having recorded a computer program for executing the motor control method according to the invention is used on the computer system 70. Used as the recording medium is a flexible disk 81 or CD-ROM (read only memory) 82, for example, but other means may be used, such as MO (magneto-optical) disk, DVD (digital versatile disk), other optical recording disks, card memory, magnetic tape, and so on.

What is claimed is:

1. A motor control method for supplying a DC motor for a predetermined time period upon starting said DC motor with a d.c. current as an initial value current, which is smaller than a d.c. current of a magnitude causing a tooth of a first gear coupled to a rotor shaft of said DC motor to generate a hitting noise when said tooth of said first gear gets into contact with a tooth of a second gear in engagement with said first gear; and wherein said predetermined time period has a length of time necessary and sufficient for bringing a tooth of said first gear into contact with a tooth of said second gear in a direction in which said first gear is going to drive and rotate said second gear, and said length of time is determined based on the value of said initial value current.

2. The motor control method according to claim 1 wherein said initial value current has a value capable of driving said first gear solely.

3. The motor control method according to claim 1 wherein said DC motor is one of a paper-supply motor, a carriage motor or a paper-feed motor of a printer.

4. A motor control method for supplying a DC motor for a predetermined time period upon starting said DC motor with a d.c. current as an initial value current, which is smaller than a threshold value current required for a first gear coupled to a rotor shaft of said DC motor to drive and rotate a second gear in engagement with said first gear; and wherein said predetermined time period has a length of time necessary and sufficient for bringing a tooth of said first gear into contact with a tooth of said second gear in a direction in which said first gear is going to drive and rotate said second gear, and said length of time is determined based on the value of said initial value current.

5. The motor control method according to claim 4 wherein said initial value current has a value capable of driving said first gear solely.

6. The motor control method according to claim 4 wherein said DC motor is one of a paper-supply motor, a carriage motor or a paper-feed motor of a printer.

7. A recording medium of a computer program having recorded a computer program for executing on a computer system a motor control method for supplying a DC motor for a predetermined time period upon starting said DC motor with a d.c. current as an initial value current, which is smaller than a d.c. current of a magnitude causing a tooth of a first gear coupled to a rotor shaft of said DC motor to generate a hitting noise when said tooth gets into contact with a tooth of a second gear in engagement with said first gear; and wherein said predetermined time period has a length of time necessary and sufficient for bringing a tooth of said first gear into contact with a tooth of said second gear in a direction in which said first gear is going to drive and rotate said second gear, and said length of time is determined based on the value of said initial value current.

8. A recording medium of a computer program having recorded a computer program for executing on a computer system a motor control method for supplying a DC motor for a predetermined time period upon starting said DC motor with a d.c. current as an initial value current, which is smaller than a threshold value current required for a first gear coupled to a rotor shaft of said DC motor to drive and rotate a second gear in engagement with said first gear; and wherein said predetermined time period has a length of time necessary and sufficient for bringing a tooth of said first gear into contact with a tooth of said second gear in a direction in which said first gear is going to drive and rotate said second gear, and said length of time is determined based on the value of said initial value current.

9. A motor control apparatus comprising an initial value current supply instruction unit that generates and outputs an initial value current supply instruction signal that instructs to supply a DC motor for a predetermined time period upon starting said DC motor with a d.c. current as an initial value current, which is smaller than a d.c. current to a magnitude causing a tooth of a first gear coupled to a rotor shaft of said DC motor to generate a hitting noise when said tooth of said first gear gets into contact with a tooth of a second gear in engagement with said first gear; and wherein said predetermined time period has a length of time necessary and sufficient for bringing a tooth of said first gear into contact with a tooth of said second gear in a direction in which said first gear is going to drive and rotate said second gear, and said length of time is determined based on the value of said initial value current.

10. The motor control method according to claim 9 wherein said initial value current has a value capable of driving said first gear solely.

11. The motor control method according to claim 9 wherein said DC motor is one of a paper-supply motor, a carriage motor or a paper-feed motor of a printer.

12. A motor control apparatus comprising an initial value current supply instruction unit that generates and outputs an initial value current supply instruction signal that instructs to supply a DC motor for a predetermined time period upon starting said DC motor with a d.c. current as an initial value current, which is smaller than a threshold value current required for a first gear coupled to a rotor shaft of said DC motor to drive and rotate a second gear in engagement with said first gear; and wherein said predetermined time period has a length of time necessary and sufficient for bringing a tooth of said first gear into contact with a tooth of said second gear in a direction in which said first gear is going to drive and rotate said second gear, and said length of time is determined based on the value of said initial value current.

13. The motor control method according to claim 12 wherein said initial value current has a value capable of driving said first gear solely.

14. The motor control method according to claim 12 wherein said DC motor is one of a paper-supply motor, a carriage motor or a paper-feed motor of a printer.

15. A motor control method for generating in a deceleration control period a waveform pattern of a target speed VC expressed by $$VC = V\max\{1-(x/N)^a\} \text{ (a is an arbitrary constant)}$$

where V max is the maximum speed of a motor to be controlled, N is the distance of each deceleration control period from a start position of a deceleration control period to a target stop position, and x is the distance from the start position of the deceleration control period to a current position, and for executing deceleration control of the motor in accordance with the waveform pattern of the target speed VC.

16. The motor control method according to claim 15 wherein the value of said arbitrary constant a is set for each deceleration control period in accordance with values of the maximum speed V max of said motor, the distance N of said deceleration control period and duration of time of the deceleration control period.

17. The motor control method according to claim 15 wherein said arbitrary constant a is fixed in a constant value.

18. The motor control method according to claim 15 wherein said deceleration control is deceleration control of normal rotational driving of said motor.

19. The motor control method according to claim 15 wherein said deceleration control is deceleration control of reverse rotational driving of said motor.

20. The motor control method according to claim 15 wherein said motor is one of a DC motor, a stepping motor or an AC motor.

21. The motor control method according to claim 15 wherein said motor is one of a carriage motor or a paper-feed motor of a printer.

22. A recording medium of a computer program having recorded a computer program for executing on a computer system a motor control method for generating in a deceleration control period a waveform pattern of a target speed VC expressed by $$VC = V\max\{1-(x/N)^a\} \text{ (a is an arbitrary constant)}$$

where V max is the maximum speed of a motor to be controlled, N is the distance of each deceleration control period from a start position of a deceleration control period to a target stop position, and x is the distance from the start position of the deceleration control period to a current position, and for executing deceleration control of the motor in accordance with the waveform pattern of the target speed VC.

23. A motor control apparatus comprising a speed instruction unit that generates in a deceleration control period a waveform pattern of a target speed VC expressed by $$VC = V\max\{1-(x/N)^a\} \text{ (a is an arbitrary constant)}$$

where V max is the maximum speed of a motor to be controlled, N is the distance of each deceleration control period from a start position of a deceleration control period to a target stop position, and x is the distance from the start position of the deceleration control period to a current position, and generates and outputs a speed instruction signal that instructs a target speed VC based on said waveform pattern of the target speed VC.

24. The motor control apparatus according to claim 23 wherein the value of said arbitrary constant a is set for each deceleration control period in accordance with values of the maximum speed V max of said motor, the distance N of said deceleration control period and duration of time of the deceleration control period.

25. The motor control apparatus according to claim 23 wherein said arbitrary constant a is fixed in a constant value.

26. The motor control apparatus according to claim 23 wherein said deceleration control is deceleration control of normal rotational driving of said motor.

27. The motor control apparatus according to claim 23 wherein said deceleration control is deceleration control of reverse rotational driving of said motor.

28. The motor control apparatus according to claim 23 wherein said motor is one of a DC motor, a stepping motor or an AC motor.

29. The motor control apparatus according to claim 23 wherein said motor is one of a carriage motor or a paper-feed motor of a printer.

30. A motor control method comprising:

supplying a DC motor for a predetermined time period upon starting said DC motor with a d.c. current as an initial value current, which is smaller than a d.c. current of a magnitude causing a tooth of a first gear coupled to a rotor shaft of said DC motor to generate a hitting noise when said tooth of said first gear gets into contact with a tooth of a second gear in engagement with said first gear; and generating in a deceleration control period a waveform pattern of a target speed VC expressed by $$VC = V\max\{1-(x/N)^a\} \text{ (a is an arbitrary constant)}$$

where V max is the maximum speed of a motor to be controlled, N is the distance of each deceleration control period from a start position of a deceleration control period to a target stop position, and x is the distance from the start position of the deceleration control period to a current position, and for executing deceleration control of the motor in accordance with the waveform pattern of the target speed VC.

31. A motor control method comprising:

supplying a DC motor for a predetermined time period upon starting said DC motor with a d.c. current as an initial value current, which is smaller than a threshold value current required for a first gear coupled to a rotor shaft of said DC motor to drive and rotate a second gear in engagement with said first gear; and generating in a deceleration control period a waveform pattern of a target speed VC expressed by $$VC = V\max\{1-(x/N)^a\} \text{ (a is an arbitrary constant)}$$

where V max is the maximum speed of a motor to be controlled, N is the distance of each deceleration control period from a start position of a deceleration control period to a target stop position, and x is the distance from the start position of the deceleration control period to a current position, and for executing deceleration control of the motor in accordance with the waveform pattern of the target speed VC.

32. A motor control apparatus comprising:

an initial value current supply instruction unit that generates and outputs an initial value current supply instruction signal that instructs to supply a DC motor for a predetermined time period upon starting said DC motor with a d.c. current as an initial value current, which is smaller than a d.c. current of a magnitude causing a tooth of a first gear coupled to a rotor shaft of said DC motor to generate a hitting noise when said tooth of said first gear gets into contact with a tooth of a second gear in engagement with said first gear; and a speed instruction unit that generates in a deceleration control period a waveform pattern of a target speed VC expressed by $$VC = V\max\{1-(x/N)^a\} \text{ (a is an arbitrary constant)}$$

where V max is the maximum speed of a motor to be controlled, N is the distance of each deceleration control period from a start position of a deceleration control period to a target stop position, and x is the distance from the start position of the deceleration control period to a current position, and generates and outputs a speed instruction signal that instructs a target speed VC based on said waveform pattern of the target speed VC.

33. A motor control apparatus comprising:

an initial value current supply instruction unit that generates and outputs an initial value current supply instruction signal that instructs to supply a DC motor for a predetermined time period upon starting said DC motor with a d.c. current as an initial value current, which is smaller than a threshold value current required for a first gear coupled to a rotor shaft of said DC motor to drive and rotate a second gear in engagement with said first gear; and a speed instruction unit that generates in a deceleration control period a waveform pattern of a target speed VC expressed by $$VC = V\max\{1-(x/N)^a\} \text{ (a is an arbitrary constant)}$$

where V max is the maximum speed of a motor to be controlled, N is the distance of each deceleration control period from a start position of a deceleration control period to a target stop position, and x is the distance from the start position of the deceleration control period to a current position, and generates and outputs a speed instruction signal that instructs a target speed VC based on said waveform pattern of the target speed VC.

* * * * *